United States Patent
George et al.

(10) Patent No.: US 10,664,169 B2
(45) Date of Patent: May 26, 2020

(54) PERFORMANCE OF OBJECT STORAGE SYSTEM BY RECONFIGURING STORAGE DEVICES BASED ON LATENCY THAT INCLUDES IDENTIFYING A NUMBER OF FRAGMENTS THAT HAS A PARTICULAR STORAGE DEVICE AS ITS PRIMARY STORAGE DEVICE AND ANOTHER NUMBER OF FRAGMENTS THAT HAS SAID PARTICULAR STORAGE DEVICE AS ITS REPLICA STORAGE DEVICE

(71) Applicant: CISCO TECHNOLOGY, INC., San Jose, CA (US)

(72) Inventors: Johnu George, San Jose, CA (US); Kai Zhang, San Jose, CA (US); Marc Solanas Tarre, San Jose, CA (US); Debojyoti Dutta, Santa Clara, CA (US); Manoj Sharma, Sunnyvale, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 12 days.

(21) Appl. No.: 15/192,255

(22) Filed: Jun. 24, 2016

(65) Prior Publication Data
US 2017/0371558 A1    Dec. 28, 2017

(51) Int. Cl.
*G06F 3/06*    (2006.01)
(52) U.S. Cl.
CPC ............ *G06F 3/0611* (2013.01); *G06F 3/067* (2013.01); *G06F 3/0631* (2013.01); *G06F 3/0643* (2013.01); *G06F 3/0653* (2013.01)
(58) Field of Classification Search
None
See application file for complete search history.

(56) References Cited

U.S. PATENT DOCUMENTS 4,688,695 A    8/1987    Hirohata
5,263,003 A    11/1993   Cowles et al.
(Continued)

FOREIGN PATENT DOCUMENTS

EP    2228719    9/2010
EP    2439637    4/2012
(Continued)

OTHER PUBLICATIONS

Xue, C, et al. "A Standard framework for Ceph performance profiling with latency breakdown," CEPH, Jun. 30, 2015, 3 pages; https://wiki.ceph.com/Planning/Blueprints/Infernalis/A_standard_framework_for_Ceph_performance_profiling_with_latency_break.

(Continued)

*Primary Examiner* — William B Partridge
*Assistant Examiner* — Chie Yew
(74) *Attorney, Agent, or Firm* — Polsinelli PC

(57) ABSTRACT

Approaches are disclosed for improving performance of logical disks. A logical disk can comprise several storage devices. In an object storage system (OSS), when a logical disk stores a file, fragments of the file are stored distributed across the storage devices. Each of the fragments of the file is asymmetrically stored in (write) and retrieved from (read) the storage devices. The performance of the logical disk is improved by reconfiguring one or more of the storage devices based on an influence that each of the storage devices has on performance of the logical disk and the asymmetric read and write operations of each of the storage devices. For example, latency of the logical disk can be reduced by reconfiguring one or more of the plurality of storage disks based on a proportion of the latency of the logical device that is attributable to each of the plurality of storage devices.

18 Claims, 10 Drawing Sheets

| LOGICAL DISK ID | STORAGE DEVICE ID | READ IMPACT FACTOR | WRITE IMPACT FACTOR | LATENCY (ms) |
|---|---|---|---|---|
| 1 | 1 | 2 | 5 | 11 |
| 1 | 2 | 2 | 5 | 19 |
| 1 | 3 | 1 | 5 | 16 |
| 2 | 3 | 1 | 2 | 16 |
| 2 | 4 | 1 | 2 | 9 |
| 2 | 5 | 1 | 2 | 4 |

(56) References Cited

U.S. PATENT DOCUMENTS

| | | | |
|---|---|---|---|
| 5,339,445 A | 8/1994 | Gasztonyi | |
| 5,430,859 A | 7/1995 | Norman et al. | |
| 5,457,746 A | 10/1995 | Dolphin | |
| 5,535,336 A | 7/1996 | Smith et al. | |
| 5,588,012 A | 12/1996 | Oizumi | |
| 5,617,421 A | 4/1997 | Chin et al. | |
| 5,680,579 A | 10/1997 | Young et al. | |
| 5,690,194 A | 11/1997 | Parker et al. | |
| 5,740,171 A | 4/1998 | Mazzola et al. | |
| 5,742,604 A | 4/1998 | Edsall et al. | |
| 5,764,636 A | 6/1998 | Edsall | |
| 5,809,285 A | 9/1998 | Hilland | |
| 5,812,814 A | 9/1998 | Sukegawa | |
| 5,812,950 A | 9/1998 | Tom | |
| 5,838,970 A | 11/1998 | Thomas | |
| 5,999,930 A | 12/1999 | Wolff | |
| 6,035,105 A | 3/2000 | McCloghrie et al. | |
| 6,101,497 A | 8/2000 | Ofek | |
| 6,148,414 A | 11/2000 | Brown et al. | |
| 6,185,203 B1 | 2/2001 | Berman | |
| 6,188,694 B1 | 2/2001 | Fine et al. | |
| 6,202,135 B1 | 3/2001 | Kedem et al. | |
| 6,208,649 B1 | 3/2001 | Kloth | |
| 6,209,059 B1 | 3/2001 | Ofer et al. | |
| 6,219,699 B1 | 4/2001 | McCloghrie et al. | |
| 6,219,753 B1 | 4/2001 | Richardson | |
| 6,223,250 B1 | 4/2001 | Yokono | |
| 6,226,771 B1 | 5/2001 | Hilla et al. | |
| 6,260,120 B1 | 7/2001 | Blumenau et al. | |
| 6,266,705 B1 | 7/2001 | Ullum et al. | |
| 6,269,381 B1 | 7/2001 | St. Pierre et al. | |
| 6,269,431 B1 | 7/2001 | Dunham | |
| 6,295,575 B1 | 9/2001 | Blumenau et al. | |
| 6,400,730 B1 | 6/2002 | Latif et al. | |
| 6,408,406 B1 | 6/2002 | Parris | |
| 6,542,909 B1 | 4/2003 | Tamer et al. | |
| 6,542,961 B1 | 4/2003 | Matsunami et al. | |
| 6,553,390 B1 | 4/2003 | Gross et al. | |
| 6,564,252 B1 | 5/2003 | Hickman et al. | |
| 6,578,121 B1 * | 6/2003 | Schutzman | G06F 11/1458 707/999.202 |
| 6,647,474 B2 | 11/2003 | Yanai et al. | |
| 6,675,258 B1 | 1/2004 | Bramhall et al. | |
| 6,683,883 B1 | 1/2004 | Czeiger et al. | |
| 6,694,413 B1 | 2/2004 | Mimatsu et al. | |
| 6,708,227 B1 | 3/2004 | Cabrera et al. | |
| 6,711,649 B1 * | 3/2004 | Bachmat | G06F 3/061 710/18 |
| 6,715,007 B1 | 3/2004 | Williams et al. | |
| 6,728,791 B1 * | 4/2004 | Young | G06F 11/2087 710/1 |
| 6,772,231 B2 | 8/2004 | Reuter et al. | |
| 6,820,099 B1 | 11/2004 | Huber et al. | |
| 6,847,647 B1 | 1/2005 | Wrenn | |
| 6,848,759 B2 | 2/2005 | Doornbos et al. | |
| 6,850,955 B2 | 2/2005 | Sonoda et al. | |
| 6,876,656 B2 | 4/2005 | Brewer et al. | |
| 6,880,062 B1 | 4/2005 | Ibrahim et al. | |
| 6,898,670 B2 | 5/2005 | Nahum | |
| 6,907,419 B1 | 6/2005 | Pesola et al. | |
| 6,912,668 B1 | 6/2005 | Brown et al. | |
| 6,952,734 B1 | 10/2005 | Gunlock et al. | |
| 6,976,090 B2 | 12/2005 | Ben-Shaul et al. | |
| 6,978,300 B1 | 12/2005 | Beukema et al. | |
| 6,983,303 B2 | 1/2006 | Pellegrino et al. | |
| 6,986,015 B2 | 1/2006 | Testardi | |
| 6,986,069 B2 | 1/2006 | Oehler et al. | |
| 7,051,056 B2 | 5/2006 | Rodriguez-Rivera et al. | |
| 7,069,465 B2 | 6/2006 | Chu et al. | |
| 7,073,017 B2 | 7/2006 | Yamamoto | |
| 7,108,339 B2 | 9/2006 | Berger | |
| 7,149,858 B1 | 12/2006 | Kiselev | |
| 7,171,514 B2 | 1/2007 | Coronado et al. | |
| 7,171,668 B2 | 1/2007 | Molloy et al. | |
| 7,174,354 B2 | 2/2007 | Andreasson | |
| 7,200,144 B2 | 4/2007 | Terrell et al. | |
| 7,222,255 B1 | 5/2007 | Claessens et al. | |
| 7,237,045 B2 | 6/2007 | Beckmann et al. | |
| 7,240,188 B2 | 7/2007 | Takata et al. | |
| 7,246,260 B2 | 7/2007 | Brown et al. | |
| 7,266,718 B2 | 9/2007 | Idei et al. | |
| 7,269,168 B2 | 9/2007 | Roy et al. | |
| 7,277,431 B2 | 10/2007 | Walter et al. | |
| 7,277,948 B2 | 10/2007 | Igarashi et al. | |
| 7,305,658 B1 | 12/2007 | Hamilton et al. | |
| 7,328,434 B2 | 2/2008 | Swanson et al. | |
| 7,340,555 B2 | 3/2008 | Ashmore et al. | |
| 7,346,751 B2 | 3/2008 | Prahlad et al. | |
| 7,352,706 B2 | 4/2008 | Klotz et al. | |
| 7,353,305 B2 | 4/2008 | Pangal et al. | |
| 7,359,321 B1 | 4/2008 | Sindhu et al. | |
| 7,383,381 B1 | 6/2008 | Faulkner et al. | |
| 7,433,326 B2 | 10/2008 | Desai et al. | |
| 7,433,948 B2 | 10/2008 | Edsall | |
| 7,434,105 B1 | 10/2008 | Rodriguez-Rivera et al. | |
| 7,441,154 B2 | 10/2008 | Klotz et al. | |
| 7,447,839 B2 | 11/2008 | Uppala | |
| 7,487,321 B2 | 2/2009 | Muthiah et al. | |
| 7,500,053 B1 | 3/2009 | Kavuri et al. | |
| 7,542,681 B2 | 6/2009 | Cornell et al. | |
| 7,558,872 B1 | 7/2009 | Senevirathne et al. | |
| 7,587,570 B2 | 9/2009 | Sarkar et al. | |
| 7,643,505 B1 | 1/2010 | Colloff | |
| 7,654,625 B2 | 2/2010 | Amann et al. | |
| 7,657,796 B1 | 2/2010 | Kaiser et al. | |
| 7,668,981 B1 | 2/2010 | Nagineni et al. | |
| 7,669,071 B2 | 2/2010 | Cochran et al. | |
| 7,689,384 B1 | 3/2010 | Becker | |
| 7,694,092 B2 | 4/2010 | Mizuno | |
| 7,697,554 B1 | 4/2010 | Ofer et al. | |
| 7,706,303 B2 | 4/2010 | Bose et al. | |
| 7,707,481 B2 | 4/2010 | Kirschner et al. | |
| 7,716,648 B2 | 5/2010 | Vaidyanathan et al. | |
| 7,752,360 B2 | 7/2010 | Galles | |
| 7,757,059 B1 | 7/2010 | Ofer et al. | |
| 7,774,329 B1 | 8/2010 | Peddy et al. | |
| 7,774,839 B2 | 8/2010 | Nazzal | |
| 7,793,138 B2 | 9/2010 | Rastogi et al. | |
| 7,840,730 B2 | 11/2010 | D'Amato et al. | |
| 7,843,906 B1 | 11/2010 | Chidambaram et al. | |
| 7,895,428 B2 | 2/2011 | Boland, IV et al. | |
| 7,904,599 B1 | 3/2011 | Bennett | |
| 7,930,494 B1 | 4/2011 | Goheer et al. | |
| 7,975,175 B2 | 7/2011 | Votta et al. | |
| 7,979,670 B2 | 7/2011 | Saliba et al. | |
| 7,984,259 B1 * | 7/2011 | English | G06F 3/061 711/114 |
| 8,031,703 B2 | 10/2011 | Gottumukkula et al. | |
| 8,032,621 B1 | 10/2011 | Upalekar et al. | |
| 8,051,197 B2 | 11/2011 | Mullendore et al. | |
| 8,086,755 B2 | 12/2011 | Duffy, IV et al. | |
| 8,161,134 B2 | 4/2012 | Mishra et al. | |
| 8,196,018 B2 | 6/2012 | Forhan et al. | |
| 8,205,951 B2 | 6/2012 | Boks | |
| 8,218,538 B1 | 7/2012 | Chidambaram et al. | |
| 8,230,066 B2 | 7/2012 | Heil | |
| 8,234,377 B2 | 7/2012 | Cohn | |
| 8,266,238 B2 | 9/2012 | Zimmer et al. | |
| 8,272,104 B2 | 9/2012 | Chen et al. | |
| 8,274,993 B2 | 9/2012 | Sharma et al. | |
| 8,290,919 B1 | 10/2012 | Kelly et al. | |
| 8,297,722 B2 | 10/2012 | Chambers et al. | |
| 8,301,746 B2 | 10/2012 | Head et al. | |
| 8,335,231 B2 | 12/2012 | Kloth et al. | |
| 8,341,121 B1 | 12/2012 | Claudatos et al. | |
| 8,345,692 B2 | 1/2013 | Smith | |
| 8,352,941 B1 | 1/2013 | Protopopov et al. | |
| 8,392,760 B2 | 3/2013 | Kandula et al. | |
| 8,442,059 B1 | 5/2013 | de la Iglesia et al. | |
| 8,479,211 B1 | 7/2013 | Marshall et al. | |
| 8,495,356 B2 | 7/2013 | Ashok et al. | |
| 8,514,868 B2 | 8/2013 | Hill | |
| 8,532,108 B2 | 9/2013 | Li et al. | |
| 8,560,663 B2 | 10/2013 | Baucke et al. | |

(56) References Cited

U.S. PATENT DOCUMENTS

| | | |
|---|---|---|
| 8,619,599 B1 | 12/2013 | Even |
| 8,626,891 B2 | 1/2014 | Guru et al. |
| 8,630,983 B2 | 1/2014 | Sengupta et al. |
| 8,660,129 B1 | 2/2014 | Brendel et al. |
| 8,661,299 B1 | 2/2014 | Ip |
| 8,677,485 B2 | 3/2014 | Sharma et al. |
| 8,683,296 B2 | 3/2014 | Anderson et al. |
| 8,706,772 B2 | 4/2014 | Hartig et al. |
| 8,719,804 B2 | 5/2014 | Jain |
| 8,725,854 B2 | 5/2014 | Edsall |
| 8,768,981 B1 | 7/2014 | Milne et al. |
| 8,775,773 B2 | 7/2014 | Acharya et al. |
| 8,793,372 B2 | 7/2014 | Ashok et al. |
| 8,805,918 B1 | 8/2014 | Chandrasekaran et al. |
| 8,805,951 B1 | 8/2014 | Faibish et al. |
| 8,832,330 B1 | 9/2014 | Lancaster |
| 8,855,116 B2 | 10/2014 | Rosset et al. |
| 8,856,339 B2 | 10/2014 | Mestery et al. |
| 8,868,474 B2 | 10/2014 | Leung et al. |
| 8,887,286 B2 | 11/2014 | Dupont et al. |
| 8,898,385 B2 | 11/2014 | Jayaraman et al. |
| 8,909,928 B2 | 12/2014 | Ahmad et al. |
| 8,918,510 B2 | 12/2014 | Gmach et al. |
| 8,924,720 B2 | 12/2014 | Raghuram et al. |
| 8,930,747 B2 | 1/2015 | Levijarvi et al. |
| 8,935,500 B1 | 1/2015 | Gulati et al. |
| 8,949,677 B1 | 2/2015 | Brundage et al. |
| 8,996,837 B1 | 3/2015 | Bono et al. |
| 9,003,086 B1 | 4/2015 | Schuller et al. |
| 9,007,922 B1 | 4/2015 | Mittal et al. |
| 9,009,427 B2 | 4/2015 | Sharma et al. |
| 9,009,704 B2 | 4/2015 | McGrath et al. |
| 9,026,492 B1* | 5/2015 | Shorey .................. G06F 16/273 707/613 |
| 9,075,638 B2 | 7/2015 | Barnett et al. |
| 9,141,554 B1 | 9/2015 | Candelaria |
| 9,141,785 B2 | 9/2015 | Mukkara et al. |
| 9,164,795 B1 | 10/2015 | Vincent |
| 9,176,677 B1 | 11/2015 | Fradkin et al. |
| 9,201,704 B2 | 12/2015 | Chang et al. |
| 9,203,784 B2 | 12/2015 | Chang et al. |
| 9,207,882 B2 | 12/2015 | Rosset et al. |
| 9,207,929 B2 | 12/2015 | Katsura |
| 9,213,612 B2 | 12/2015 | Candelaria |
| 9,223,564 B2 | 12/2015 | Munireddy et al. |
| 9,223,634 B2 | 12/2015 | Chang et al. |
| 9,244,761 B2 | 1/2016 | Yekhanin et al. |
| 9,250,969 B2 | 2/2016 | Lager-Cavilla et al. |
| 9,264,494 B2 | 2/2016 | Factor et al. |
| 9,270,754 B2 | 2/2016 | Iyengar et al. |
| 9,280,487 B2 | 3/2016 | Candelaria |
| 9,304,815 B1 | 4/2016 | Vasanth et al. |
| 9,313,048 B2 | 4/2016 | Chang et al. |
| 9,374,270 B2 | 6/2016 | Nakil et al. |
| 9,378,060 B2 | 6/2016 | Jansson et al. |
| 9,396,251 B1 | 7/2016 | Boudreau et al. |
| 9,448,877 B2 | 9/2016 | Candelaria |
| 9,471,348 B2 | 10/2016 | Zuo et al. |
| 9,501,473 B1 | 11/2016 | Kong et al. |
| 9,503,523 B2 | 11/2016 | Rosset et al. |
| 9,565,110 B2 | 2/2017 | Mullendore et al. |
| 9,575,828 B2 | 2/2017 | Agarwal et al. |
| 9,614,763 B2 | 4/2017 | Dong et al. |
| 9,658,868 B2 | 5/2017 | Hill |
| 9,658,876 B2 | 5/2017 | Chang et al. |
| 9,733,868 B2 | 8/2017 | Chandrasekaran et al. |
| 9,763,518 B2 | 9/2017 | Charest et al. |
| 9,830,240 B2 | 11/2017 | George et al. |
| 9,853,873 B2 | 12/2017 | Dasu et al. |
| 2002/0049980 A1 | 4/2002 | Hoang |
| 2002/0053009 A1 | 5/2002 | Selkirk et al. |
| 2002/0073276 A1 | 6/2002 | Howard et al. |
| 2002/0083120 A1 | 6/2002 | Soltis |
| 2002/0095547 A1 | 7/2002 | Watanabe et al. |
| 2002/0103889 A1 | 8/2002 | Markson et al. |
| 2002/0103943 A1 | 8/2002 | Lo et al. |
| 2002/0112113 A1 | 8/2002 | Karpoff et al. |
| 2002/0120741 A1 | 8/2002 | Webb et al. |
| 2002/0138675 A1 | 9/2002 | Mann |
| 2002/0156971 A1* | 10/2002 | Jones .................... G06F 9/4401 711/113 |
| 2003/0023885 A1 | 1/2003 | Potter et al. |
| 2003/0026267 A1 | 2/2003 | Oberman et al. |
| 2003/0055933 A1 | 3/2003 | Ishizaki et al. |
| 2003/0056126 A1 | 3/2003 | O'Connor et al. |
| 2003/0065986 A1 | 4/2003 | Fraenkel et al. |
| 2003/0084359 A1 | 5/2003 | Bresniker et al. |
| 2003/0118053 A1 | 6/2003 | Edsall et al. |
| 2003/0131105 A1 | 7/2003 | Czeiger et al. |
| 2003/0131165 A1 | 7/2003 | Asano et al. |
| 2003/0131182 A1 | 7/2003 | Kumar et al. |
| 2003/0140134 A1 | 7/2003 | Swanson et al. |
| 2003/0140210 A1 | 7/2003 | Testardi |
| 2003/0149763 A1 | 8/2003 | Heitman et al. |
| 2003/0154271 A1 | 8/2003 | Baldwin et al. |
| 2003/0159058 A1 | 8/2003 | Eguchi et al. |
| 2003/0174725 A1 | 9/2003 | Shankar |
| 2003/0189395 A1 | 10/2003 | Doornbos et al. |
| 2003/0210686 A1 | 11/2003 | Terrell et al. |
| 2004/0024961 A1 | 2/2004 | Cochran et al. |
| 2004/0030857 A1 | 2/2004 | Krakirian et al. |
| 2004/0039939 A1 | 2/2004 | Cox et al. |
| 2004/0054776 A1 | 3/2004 | Klotz et al. |
| 2004/0057389 A1 | 3/2004 | Klotz et al. |
| 2004/0059807 A1 | 3/2004 | Klotz et al. |
| 2004/0088574 A1 | 5/2004 | Walter et al. |
| 2004/0117438 A1 | 6/2004 | Considine et al. |
| 2004/0123029 A1 | 6/2004 | Dalai et al. |
| 2004/0128470 A1 | 7/2004 | Hetzler et al. |
| 2004/0153863 A1 | 8/2004 | Klotz et al. |
| 2004/0215749 A1 | 10/2004 | Tsao |
| 2004/0230848 A1 | 11/2004 | Mayo et al. |
| 2004/0250034 A1 | 12/2004 | Yagawa et al. |
| 2005/0033936 A1 | 2/2005 | Nakano et al. |
| 2005/0036499 A1 | 2/2005 | Dutt et al. |
| 2005/0050211 A1 | 3/2005 | Kaul et al. |
| 2005/0050270 A1* | 3/2005 | Horn .................... G06F 3/0608 711/114 |
| 2005/0053073 A1 | 3/2005 | Kloth et al. |
| 2005/0055428 A1 | 3/2005 | Terai et al. |
| 2005/0060574 A1 | 3/2005 | Klotz et al. |
| 2005/0060598 A1 | 3/2005 | Klotz et al. |
| 2005/0071851 A1 | 3/2005 | Opheim |
| 2005/0076113 A1 | 4/2005 | Klotz et al. |
| 2005/0091426 A1 | 4/2005 | Horn et al. |
| 2005/0114615 A1 | 5/2005 | Ogasawara et al. |
| 2005/0117522 A1 | 6/2005 | Basavaiah et al. |
| 2005/0117562 A1 | 6/2005 | Wrenn |
| 2005/0138287 A1 | 6/2005 | Ogasawara et al. |
| 2005/0185597 A1 | 8/2005 | Le et al. |
| 2005/0188170 A1 | 8/2005 | Yamamoto |
| 2005/0235072 A1 | 10/2005 | Smith et al. |
| 2005/0283658 A1 | 12/2005 | Clark et al. |
| 2006/0015861 A1 | 1/2006 | Takata et al. |
| 2006/0015928 A1 | 1/2006 | Setty et al. |
| 2006/0034302 A1 | 2/2006 | Peterson |
| 2006/0045021 A1 | 3/2006 | Deragon et al. |
| 2006/0098672 A1 | 5/2006 | Schzukin et al. |
| 2006/0117099 A1 | 6/2006 | Mogul |
| 2006/0136684 A1 | 6/2006 | Le et al. |
| 2006/0184287 A1 | 8/2006 | Belady et al. |
| 2006/0198319 A1 | 9/2006 | Schondelmayer et al. |
| 2006/0215297 A1 | 9/2006 | Kikuchi |
| 2006/0230227 A1 | 10/2006 | Ogasawara et al. |
| 2006/0242332 A1 | 10/2006 | Johnsen et al. |
| 2006/0251111 A1 | 11/2006 | Kloth et al. |
| 2007/0005297 A1 | 1/2007 | Beresniewicz et al. |
| 2007/0067593 A1 | 3/2007 | Satoyama et al. |
| 2007/0079068 A1 | 4/2007 | Draggon |
| 2007/0094465 A1 | 4/2007 | Sharma et al. |
| 2007/0101202 A1 | 5/2007 | Garbow |
| 2007/0121519 A1 | 5/2007 | Cuni et al. |
| 2007/0136541 A1 | 6/2007 | Herz et al. |
| 2007/0162969 A1 | 7/2007 | Becker |

(56) References Cited

U.S. PATENT DOCUMENTS

| | | |
|---|---|---|
| 2007/0211640 A1 | 9/2007 | Palacharla et al. |
| 2007/0214316 A1 | 9/2007 | Kim |
| 2007/0250838 A1 | 10/2007 | Belady et al. |
| 2007/0263545 A1 | 11/2007 | Foster et al. |
| 2007/0276884 A1 | 11/2007 | Hara et al. |
| 2007/0283059 A1 | 12/2007 | Ho et al. |
| 2008/0016412 A1 | 1/2008 | White et al. |
| 2008/0034149 A1 | 2/2008 | Sheen |
| 2008/0052459 A1 | 2/2008 | Chang et al. |
| 2008/0059698 A1 | 3/2008 | Kabir et al. |
| 2008/0114933 A1 | 5/2008 | Ogasawara et al. |
| 2008/0126509 A1 | 5/2008 | Subrannanian et al. |
| 2008/0126734 A1 | 5/2008 | Murase |
| 2008/0168304 A1 | 7/2008 | Flynn et al. |
| 2008/0201616 A1 | 8/2008 | Ashmore |
| 2008/0209044 A1* | 8/2008 | Forrester ............ G06F 9/505 709/226 |
| 2008/0244184 A1 | 10/2008 | Lewis et al. |
| 2008/0256082 A1 | 10/2008 | Davies et al. |
| 2008/0267217 A1 | 10/2008 | Colville et al. |
| 2008/0288661 A1 | 11/2008 | Galles |
| 2008/0294888 A1 | 11/2008 | Ando et al. |
| 2009/0063766 A1 | 3/2009 | Matsumura et al. |
| 2009/0083484 A1 | 3/2009 | Basham et al. |
| 2009/0089567 A1 | 4/2009 | Boland, IV et al. |
| 2009/0094380 A1 | 4/2009 | Qiu et al. |
| 2009/0094664 A1 | 4/2009 | Butler et al. |
| 2009/0125694 A1 | 5/2009 | Innan et al. |
| 2009/0193223 A1 | 7/2009 | Saliba et al. |
| 2009/0201926 A1 | 8/2009 | Kagan et al. |
| 2009/0222733 A1 | 9/2009 | Basham et al. |
| 2009/0240873 A1 | 9/2009 | Yu et al. |
| 2009/0282471 A1 | 11/2009 | Green et al. |
| 2009/0323706 A1 | 12/2009 | Germain et al. |
| 2010/0011365 A1 | 1/2010 | Gerovac et al. |
| 2010/0030995 A1 | 2/2010 | Wang et al. |
| 2010/0046378 A1 | 2/2010 | Knapp et al. |
| 2010/0083055 A1 | 4/2010 | Ozonat |
| 2010/0174968 A1 | 7/2010 | Charles et al. |
| 2010/0318609 A1 | 12/2010 | Lahiri et al. |
| 2010/0318837 A1 | 12/2010 | Murphy et al. |
| 2011/0010394 A1 | 1/2011 | Carew et al. |
| 2011/0022691 A1 | 1/2011 | Banerjee et al. |
| 2011/0029824 A1 | 2/2011 | Schöler et al. |
| 2011/0035494 A1 | 2/2011 | Pandey et al. |
| 2011/0075667 A1 | 3/2011 | Li et al. |
| 2011/0087848 A1 | 4/2011 | Trent |
| 2011/0119556 A1 | 5/2011 | de Buen |
| 2011/0142053 A1 | 6/2011 | Van Der Merwe et al. |
| 2011/0173303 A1 | 7/2011 | Rider |
| 2011/0228679 A1 | 9/2011 | Varma et al. |
| 2011/0231899 A1 | 9/2011 | Pulier et al. |
| 2011/0239039 A1 | 9/2011 | Dieffenbach et al. |
| 2011/0252274 A1 | 10/2011 | Kawaguchi et al. |
| 2011/0276584 A1 | 11/2011 | Cotner et al. |
| 2011/0276675 A1 | 11/2011 | Singh et al. |
| 2011/0276951 A1 | 11/2011 | Jain |
| 2011/0299539 A1 | 12/2011 | Rajagopal et al. |
| 2011/0307450 A1 | 12/2011 | Hahn et al. |
| 2011/0313973 A1 | 12/2011 | Srivas et al. |
| 2012/0023319 A1 | 1/2012 | Chin et al. |
| 2012/0030401 A1 | 2/2012 | Cowan et al. |
| 2012/0054367 A1 | 3/2012 | Ramakrishnan et al. |
| 2012/0072578 A1 | 3/2012 | Alam |
| 2012/0072985 A1 | 3/2012 | Davne et al. |
| 2012/0084445 A1 | 4/2012 | Brock et al. |
| 2012/0084782 A1 | 4/2012 | Chou et al. |
| 2012/0096134 A1 | 4/2012 | Suit |
| 2012/0130874 A1 | 5/2012 | Mane et al. |
| 2012/0131174 A1 | 5/2012 | Ferris et al. |
| 2012/0134672 A1 | 5/2012 | Banerjee |
| 2012/0144014 A1 | 6/2012 | Natham et al. |
| 2012/0167094 A1 | 6/2012 | Suit |
| 2012/0173581 A1 | 7/2012 | Hartig et al. |
| 2012/0173589 A1 | 7/2012 | Kwon et al. |
| 2012/0177039 A1 | 7/2012 | Berman |
| 2012/0177041 A1 | 7/2012 | Berman |
| 2012/0177042 A1 | 7/2012 | Berman |
| 2012/0177043 A1 | 7/2012 | Berman |
| 2012/0177044 A1 | 7/2012 | Berman |
| 2012/0177045 A1 | 7/2012 | Berman |
| 2012/0177370 A1 | 7/2012 | Berman |
| 2012/0179909 A1 | 7/2012 | Sagi et al. |
| 2012/0210041 A1 | 8/2012 | Flynn et al. |
| 2012/0254440 A1 | 10/2012 | Wang |
| 2012/0265976 A1 | 10/2012 | Spiers et al. |
| 2012/0281706 A1 | 11/2012 | Agarwal et al. |
| 2012/0297088 A1 | 11/2012 | Wang et al. |
| 2012/0303618 A1 | 11/2012 | Dutta et al. |
| 2012/0311106 A1 | 12/2012 | Morgan |
| 2012/0311568 A1 | 12/2012 | Jansen |
| 2012/0320788 A1 | 12/2012 | Venkataramanan et al. |
| 2012/0324114 A1 | 12/2012 | Dutta et al. |
| 2012/0331119 A1 | 12/2012 | Bose et al. |
| 2013/0003737 A1 | 1/2013 | Sinicrope |
| 2013/0013664 A1 | 1/2013 | Baird et al. |
| 2013/0028135 A1 | 1/2013 | Berman |
| 2013/0036212 A1 | 2/2013 | Jibbe et al. |
| 2013/0036213 A1 | 2/2013 | Hasan et al. |
| 2013/0036449 A1 | 2/2013 | Mukkara et al. |
| 2013/0054888 A1 | 2/2013 | Bhat et al. |
| 2013/0061089 A1 | 3/2013 | Valiyaparambil et al. |
| 2013/0067162 A1 | 3/2013 | Jayaraman et al. |
| 2013/0080823 A1 | 3/2013 | Roth et al. |
| 2013/0086340 A1 | 4/2013 | Fleming et al. |
| 2013/0100858 A1 | 4/2013 | Kamath et al. |
| 2013/0111540 A1 | 5/2013 | Sabin |
| 2013/0138816 A1 | 5/2013 | Kuo et al. |
| 2013/0138836 A1 | 5/2013 | Cohen et al. |
| 2013/0139138 A1 | 5/2013 | Kakos |
| 2013/0144933 A1 | 6/2013 | Hinni et al. |
| 2013/0152076 A1 | 6/2013 | Patel |
| 2013/0152175 A1 | 6/2013 | Hromoko et al. |
| 2013/0163426 A1 | 6/2013 | Beliveau et al. |
| 2013/0163606 A1 | 6/2013 | Bagepalli et al. |
| 2013/0179941 A1 | 7/2013 | McGloin et al. |
| 2013/0182712 A1 | 7/2013 | Aguayo et al. |
| 2013/0185433 A1 | 7/2013 | Zhu et al. |
| 2013/0191106 A1 | 7/2013 | Kephart et al. |
| 2013/0198730 A1 | 8/2013 | Munireddy et al. |
| 2013/0208888 A1 | 8/2013 | Agrawal et al. |
| 2013/0212130 A1 | 8/2013 | Rahnama |
| 2013/0238641 A1 | 9/2013 | Mandelstein et al. |
| 2013/0266307 A1 | 10/2013 | Garg et al. |
| 2013/0268922 A1 | 10/2013 | Tiwari et al. |
| 2013/0275470 A1 | 10/2013 | Cao et al. |
| 2013/0297655 A1 | 11/2013 | Narasayya et al. |
| 2013/0297769 A1 | 11/2013 | Chang et al. |
| 2013/0318134 A1 | 11/2013 | Bolik et al. |
| 2013/0318288 A1 | 11/2013 | Khan et al. |
| 2014/0006708 A1 | 1/2014 | Huynh et al. |
| 2014/0016493 A1 | 1/2014 | Johnsson et al. |
| 2014/0019684 A1* | 1/2014 | Wei ............ G06F 11/1076 711/114 |
| 2014/0025770 A1 | 1/2014 | Warfield et al. |
| 2014/0029441 A1 | 1/2014 | Nydell |
| 2014/0029442 A1 | 1/2014 | Wallman |
| 2014/0039683 A1 | 2/2014 | Zimmermann et al. |
| 2014/0040473 A1 | 2/2014 | Ho et al. |
| 2014/0040883 A1 | 2/2014 | Tompkins |
| 2014/0047201 A1 | 2/2014 | Mehta |
| 2014/0053264 A1 | 2/2014 | Dubrovsky et al. |
| 2014/0059187 A1 | 2/2014 | Rosset et al. |
| 2014/0059266 A1 | 2/2014 | Ben-Michael et al. |
| 2014/0086253 A1 | 3/2014 | Yong |
| 2014/0089273 A1 | 3/2014 | Borshack et al. |
| 2014/0096249 A1 | 4/2014 | Dupont et al. |
| 2014/0105009 A1 | 4/2014 | Vos et al. |
| 2014/0108474 A1 | 4/2014 | David et al. |
| 2014/0109071 A1 | 4/2014 | Ding et al. |
| 2014/0112122 A1 | 4/2014 | Kapadia et al. |
| 2014/0123207 A1 | 5/2014 | Agarwal et al. |
| 2014/0156557 A1 | 6/2014 | Zeng et al. |
| 2014/0164666 A1 | 6/2014 | Yand |

(56) References Cited

U.S. PATENT DOCUMENTS

| | | |
|---|---|---|
| 2014/0164866 A1 | 6/2014 | Bolotov et al. |
| 2014/0172371 A1 | 6/2014 | Zhu et al. |
| 2014/0173060 A1 | 6/2014 | Jubran et al. |
| 2014/0173195 A1 | 6/2014 | Rosset et al. |
| 2014/0173579 A1 | 6/2014 | McDonald et al. |
| 2014/0189278 A1 | 7/2014 | Peng |
| 2014/0198794 A1 | 7/2014 | Mehta et al. |
| 2014/0211661 A1 | 7/2014 | Gorkemli et al. |
| 2014/0215265 A1 | 7/2014 | Mohanta et al. |
| 2014/0215590 A1 | 7/2014 | Brand |
| 2014/0219086 A1 | 8/2014 | Cantu' et al. |
| 2014/0222953 A1 | 8/2014 | Karve et al. |
| 2014/0229790 A1 | 8/2014 | Goss et al. |
| 2014/0244585 A1 | 8/2014 | Sivasubramanian et al. |
| 2014/0244897 A1 | 8/2014 | Goss et al. |
| 2014/0245435 A1 | 8/2014 | Belenky |
| 2014/0269390 A1 | 9/2014 | Ciodaru et al. |
| 2014/0281700 A1 | 9/2014 | Nagesharao et al. |
| 2014/0297941 A1 | 10/2014 | Rajani et al. |
| 2014/0307578 A1 | 10/2014 | DeSanti |
| 2014/0317206 A1 | 10/2014 | Lomelino et al. |
| 2014/0324862 A1 | 10/2014 | Bingham et al. |
| 2014/0325208 A1 | 10/2014 | Resch et al. |
| 2014/0331276 A1 | 11/2014 | Frascadore et al. |
| 2014/0348166 A1 | 11/2014 | Yang et al. |
| 2014/0355450 A1 | 12/2014 | Bhikkaji et al. |
| 2014/0366155 A1 | 12/2014 | Chang et al. |
| 2015/0003450 A1 | 1/2015 | Salam et al. |
| 2015/0003458 A1 | 1/2015 | Li et al. |
| 2015/0003463 A1 | 1/2015 | Li et al. |
| 2015/0010001 A1 | 1/2015 | Duda et al. |
| 2015/0016461 A1 | 1/2015 | Qiang |
| 2015/0030024 A1 | 1/2015 | Venkataswami et al. |
| 2015/0046123 A1 | 2/2015 | Kato |
| 2015/0063353 A1 | 3/2015 | Kapadia et al. |
| 2015/0067001 A1 | 3/2015 | Koltsidas |
| 2015/0082432 A1 | 3/2015 | Eaton et al. |
| 2015/0120907 A1 | 4/2015 | Niestemski et al. |
| 2015/0121131 A1 | 4/2015 | Kiselev et al. |
| 2015/0127979 A1 | 5/2015 | Doppalapudi |
| 2015/0169313 A1 | 6/2015 | Katsura |
| 2015/0180672 A1 | 6/2015 | Kuwata |
| 2015/0207763 A1 | 6/2015 | Bertran Ortiz et al. |
| 2015/0205974 A1 | 7/2015 | Talley et al. |
| 2015/0222444 A1 | 8/2015 | Sarkar |
| 2015/0229546 A1 | 8/2015 | Somaiya et al. |
| 2015/0248366 A1 | 9/2015 | Bergsten et al. |
| 2015/0248418 A1 | 9/2015 | Bhardwaj et al. |
| 2015/0254003 A1 | 9/2015 | Lee et al. |
| 2015/0254088 A1 | 9/2015 | Chou et al. |
| 2015/0261446 A1 | 9/2015 | Lee |
| 2015/0263993 A1 | 9/2015 | Kuch et al. |
| 2015/0269048 A1 | 9/2015 | Marr et al. |
| 2015/0281067 A1 | 10/2015 | Wu |
| 2015/0303949 A1 | 10/2015 | Jafarkhani et al. |
| 2015/0341237 A1 | 11/2015 | Cuni et al. |
| 2015/0341239 A1 | 11/2015 | Bertran Ortiz et al. |
| 2015/0358136 A1 | 12/2015 | Medard |
| 2015/0379150 A1 | 12/2015 | Duda |
| 2016/0011936 A1 | 1/2016 | Luby |
| 2016/0011942 A1 | 1/2016 | Golbourn et al. |
| 2016/0062820 A1 | 3/2016 | Jones et al. |
| 2016/0070652 A1 | 3/2016 | Sundararaman et al. |
| 2016/0087885 A1 | 3/2016 | Tripathi et al. |
| 2016/0088083 A1 | 3/2016 | Bharadwaj et al. |
| 2016/0119159 A1 | 4/2016 | Zhao et al. |
| 2016/0139820 A1* | 5/2016 | Fluman .............. G06F 3/0605 711/114 |
| 2016/0205189 A1 | 7/2016 | Mopur et al. |
| 2016/0210161 A1 | 7/2016 | Rosset et al. |
| 2016/0274926 A1 | 9/2016 | Narasimhamurthy et al. |
| 2016/0285760 A1 | 9/2016 | Dong |
| 2016/0292359 A1 | 10/2016 | Tellis et al. |
| 2016/0294983 A1 | 10/2016 | Kliteynik et al. |
| 2016/0334998 A1 | 11/2016 | George et al. |
| 2016/0366094 A1 | 12/2016 | Mason et al. |
| 2016/0378624 A1 | 12/2016 | Jenkins, Jr. et al. |
| 2016/0380694 A1 | 12/2016 | Guduru |
| 2017/0010874 A1 | 1/2017 | Rosset |
| 2017/0010930 A1 | 1/2017 | Dutta et al. |
| 2017/0019475 A1 | 1/2017 | Metz et al. |
| 2017/0068630 A1 | 3/2017 | Iskandar et al. |
| 2017/0168970 A1 | 6/2017 | Sajeepa et al. |
| 2017/0177860 A1 | 6/2017 | Suarez et al. |
| 2017/0212858 A1 | 7/2017 | Chu et al. |
| 2017/0277655 A1 | 9/2017 | Das et al. |
| 2017/0337097 A1 | 11/2017 | Sipos et al. |
| 2017/0340113 A1 | 11/2017 | Charest et al. |

FOREIGN PATENT DOCUMENTS

| | | |
|---|---|---|
| EP | 2680155 | 1/2014 |
| GB | 2350028 | 5/2001 |
| JP | 2000-242434 | 9/2000 |
| TW | 1566104 | 1/2017 |
| WO | WO 2004/077214 | 9/2004 |
| WO | WO 2016/003408 | 1/2016 |
| WO | WO 2016/003489 | 1/2016 |

OTHER PUBLICATIONS

Weil, S., et al. "Ceph: A scalable, high-performance distributed file system," Proceedings of the 7th symposium on Operating systems design and implementation. USENIX Association, Nov. 6, 2006, 14 pages; http://www.ssrc.ucsc.edu/Papers/weil-osdi06.pdf.

Weil, Sage A., et al. "CRUSH: Controlled, scalable, decentralized placement of replicated data." Proceedings of the 2006 ACM/IEEE conference on Supercomputing. ACM, Nov. 11, 2006, 12 pages; http://sc06.supercomp.org/schedule/pdf/pap107.pdf.

Hatzieleftheriou, A., et al., "Host-side Filesystem Journaling for Durable Shared Storage," 13th USENIX Conference on File and Storage Technologies (FAST '15), Feb. 16-19, 2015, 9 pages; https://www.usenix.org/system/files/conference/fast15/fast15-paper-hatzieleftheriou.pdf.

Wang, F., et al. "OBFS: A File System for Object-Based Storage Devices," Storage System Research Center, MSST. vol. 4., Apr. 2004, 18 pages.

Wu, J., et al., "The Design, and Implementation of AQuA: An Adaptive Quality of Service Aware Object-Based Storage Device," Department of Computer Science, MSST, May 17, 2006, 25 pages; http://storageconference.us/2006/Presentations/30Wu.pdf.

Author Unknown, "5 Benefits of a Storage Gateway in the Cloud," Blog, TwinStrata, Inc., posted Jul. 10, 2012, 4 pages, https://web.archive.org/web/20120725092619/http://blog.twinstrata.com/2012/07/10//5-benefits-of-a-storage-gateway-in-the-cloud.

Author Unknown, "Configuration Interface for IBM System Storage DS5000, IBM DS4000, and IBM DS3000 Systems," IBM SAN Volume Controller Version 7.1, IBM® System Storage® SAN Volume Controller Information Center, Jun. 16, 2013, 3 pages.

Author Unknown, "Coraid EtherCloud, Software-Defined Storage with Scale-Out Infrastructure," Solution Brief, 2013, 2 pages, Coraid, Redwood City, California, U.S.A.

Author Unknown, "Coraid Virtual DAS (VDAS) Technology: Eliminate Tradeoffs between DAS and Networked Storage," Coraid Technology Brief, © 2013 Cora id, Inc., Published on or about Mar. 20, 2013, 2 pages.

Author Unknown, "Creating Performance-based SAN SLAs Using Finisar's NetWisdom" May 2006, 7 pages, Finisar Corporation, Sunnyvale, California, U.S.A.

Author Unknown, "Data Center, Metro Cloud Connectivity: Integrated Metro SAN Connectivity in 16 Gbps Switches," Brocade Communication Systems, Inc., Apr. 2011, 14 pages.

Author Unknown, "Data Center, SAN Fabric Administration Best Practices Guide, Support Perspective," Brocade Communication Systems, Inc., May 2013, 21 pages.

Author Unknown, "delphi—Save a CRC value in a file, without altering the actual CRC Checksum?" Stack Overflow, stackoverflow.

(56) References Cited

OTHER PUBLICATIONS com, Dec. 23, 2011, XP055130879, 3 pages http://stackoverflow.com/questions/8608219/save-a-crc-value-in-a-file-without-altering-the-actual-crc-checksum.

Author Unknown, "EMC Unisphere: Innovative Approach to Managing Low-End and Midrange Storage; Redefining Simplicity in the Entry-Level and Midrange Storage Markets," Data sheet, EMC Corporation; published on or about Jan. 4, 2013 [Retrieved and printed Sep. 12, 2013] 6 pages http://www.emc.com/storage/vnx/unisphere.htm.

Author Unknown, "HP XP Array Manager Software—Overview & Features," Storage Device Management Software; Hewlett-Packard Development Company, 3 pages; © 2013 Hewlett-Packard Development Company, L.P.

Author Unknown, "Joint Cisco and VMWare Solution for Optimizing Virtual Desktop Delivery: Data Center 3.0: Solutions to Accelerate Data Center Virtualization," Cisco Systems, Inc. and VMware, Inc., Sep. 2008, 10 pages.

Author Unknown, "Network Transformation with Software-Defined Networking and Ethernet Fabrics," Positioning Paper, 2012, 6 pages, Brocade Communications Systems.

Author Unknown, "Recreating Real Application Traffic in Junosphere Lab," Solution Brief, Juniper Networks, Dec. 2011, 3 pages.

Author Unknown, "Shunra for HP Softwarer," Enabiling Confidence in Application Performance Before Deployment, 2010, 2 pages.

Author Unknown, "Software Defined Networking: The New Norm for Networks," White Paper, Open Networking Foundation, Apr. 13, 2012, 12 pages.

Author Unknown, "Software Defined Storage Networks an Introduction," White Paper, Doc # 01-000030-001 Rev. A, Dec. 12, 2012, 8 pages; Jeda Networks, Newport Beach, California, U.S.A.

Author Unknown, "Standard RAID Levels," Wikipedia, the Free Encyclopedia, last updated Jul. 18, 2014, 7 pages; http://en.wikipedia.org/wiki/Standard_RAID_levels.

Author Unknown, "Storage Infrastructure for the Cloud," Solution Brief, © 2012, 3 pages; coraid, Redwood City, California, U.S.A.

Author Unknown, "Storage Area Network—NPIV: Emulex Virtual HBA and Brocade, Proven Interoperability and Proven Solution," Technical Brief, Apr. 2008, 4 pages, Emulex and Brocade Communications Systems.

Author Unknown, "The Fundamentals of Software-Defined Storage, Simplicity at Scale for Cloud-Architectures" Solution Brief, 2013, 3 pages; Coraid, Redwood City, California, U.S.A.

Author Unknown, "VirtualWisdom® SAN Performance Probe Family Models: Probe FC8, HD, and HD48," Virtual Instruments Data Sheet, Apr. 2014 Virtual Instruments. All Rights Reserved; 4 pages.

Author Unknown, "Xgig Analyzer: Quick Start Feature Guide 4.0," Feb. 2008, 24 pages, Finisar Corporation, Sunnyvale, California, U.S.A.

Author Unknown, "Sun Storage Common Array Manager Installation and Setup Guide," Software Installation and Setup Guide Version 6.7.x 821-1362-10, Appendix D: Configuring In-Band Management, Sun Oracle; retrieved and printed Sep. 12, 2013, 15 pages.

Author Unknown, "Vblock Solution for SAP: Simplified Provisioning for Operation Efficiency," VCE White Paper, VCE—The Virtual Computing Environment Company, Aug. 2011, 11 pages.

Berman, Stuart, et al., "Start-Up Jeda Networks in Software Defined Storage Network Technology," Press Release, Feb. 25, 2013, 2 pages, http://www.storagenewsletter.com/news/startups/jeda-networks.

Borovick, Lucinda, et al., "White Paper, Architecting the Network for the Cloud," IDC Analyze the Future, Jan. 2011, pp. 1-8.

Chakrabarti, Kaushik, et al., "Locally Adaptive Dimensionality Reduction for Indexing Large Time Series Databases," ACM Transactions on Database Systems, vol. 27, No. 2, Jun. 2009, pp. 188-228.

Chandola, Varun, et al., "A Gaussian Process Based Online Change Detection Algorithm for Monitoring Periodic Time Series," Proceedings of the Eleventh SIAM International Conference on Data Mining, SDM 2011, Apr. 28-30, 2011, 12 pages.

Cisco Systems, Inc. "N-Port Virtualization in the Data Center," Cisco White Paper, Cisco Systems, Inc., Mar. 2008, 7 pages.

Cisco Systems, Inc., "Best Practices in Deploying Cisco Nexus 1000V Series Switches on Cisco UCS B and C Series Cisco UCS Manager Servers," White Paper, Cisco Systems, Inc., Apr. 2011, 36 pages.

Cisco Systems, Inc., "Cisco Prime Data Center Network Manager 6.1," At-A-Glance, © 2012, 3 pages.

Cisco Systems, Inc., "Cisco Prime Data Center Network Manager," Release 6.1 Data Sheet, © 2012, 10 pages.

Cisco Systems, Inc., "Cisco Unified Network Services: Overcome Obstacles to Cloud-Ready Deployments," White Paper, Cisco Systems, Inc., Jan. 2011, 6 pages.

Clarke, Alan, et al., "Open Data Center Alliance Usage: Virtual Machine (VM) Interoperability in a Hybrid Cloud Environment Rev. 1.2," Open Data Center Alliance, Inc., 2013, pp. 1-18.

Cummings, Roger, et al., Fibre Channel—Fabric Generic Requirements (FC-FG), Dec. 4, 1996, 33 pages, American National Standards Institute, Inc., New York, New York, U.S.A.

Farber, Franz, et al. "An In-Memory Database System for Multi-Tenant Applications," Proceedings of 14th Business, Technology and Web (BTW) Conference on Database Systems for Business, Technology, and Web, Feb. 28 to Mar. 4, 2011, 17 pages, University of Kaiserslautern, Germany.

Guo, Chang Jie, et al., "IBM Resarch Report: Data Integration and Composite Business Services, Part 3, Building a Multi-Tenant Data Tier with with [sic] Access Control and Security," RC24426 (C0711-037), Nov. 19, 2007, 20 pages, IBM.

Hedayat, K., et al., "A Two-Way Active Measurement Protocol (TWAMP)," Network Working Group, RFC 5357, Oct. 2008, 26 pages.

Horn, C., et al., "Online anomaly detection with expert system feedback in social networks," 2011 IEEE International Conference on Acoustics, Speech and Signal Processing (ICASSP), May 22-27, 2011, 2 pages, Prague; [Abstract only].

Hosterman, Cody, et al., "Using EMC Symmetrix Storage in VMware vSph ere Environments," Version 8.0, EMC²Techbooks, EMC Corporation; published on or about Jul. 8, 2008, 314 pages; [Retrieved and printed Sep. 12, 2013].

Hu, Yuchong, et al., "Cooperative Recovery of Distributed Storage Systems from Multiple Losses with Network Coding," University of Science & Technology of China, Feb. 2010, 9 pages.

Keogh, Eamonn, et al., "Dimensionality Reduction for Fast Similarity Search in Large Time Series Databases," KAIS Long Paper submitted May 16, 2000; 19 pages.

Kolyshkin, Kirill, "Virtualization in Linux," Sep. 1, 2006, pp. 1-5.

Kovar, Joseph F., "Startup Jeda Networks Takes SDN Approach to Storage Networks," CRN Press Release, Feb. 22, 2013, 1 page, http://www.crn.com/240149244/printablearticle.htm.

Lampson, Butler, W., et al., "Crash Recovery in a Distributed Data Storage System," Jun. 1, 1979, 28 pages.

Lewis, Michael E., et al., "Design of an Advanced Development Model Optical Disk-Based Redundant Array of Independent Disks (RAID) High Speed Mass Storage Subsystem," Final Technical Report, Oct. 1997, pp. 1-211.

Lin, Jessica, "Finding Motifs in Time Series," SIGKDD'02 Jul. 23-26, 2002, 11 pages, Edmonton, Alberta, Canada.

Linthicum, David, "VM Import could be a game changer for hybrid clouds", InfoWorld, Dec. 23, 2010, 4 pages.

Long, Abraham Jr., "Modeling the Reliability of RAID Sets," Dell Power Solutions, May 2008, 4 pages.

Ma, Ao, et al., "RAIDShield: Characterizing, Monitoring, and Proactively Protecting Against Disk Failures," FAST '15, 13th USENIX Conference on File and Storage Technologies, Feb. 16-19, 2015, 17 pages, Santa Clara, California, U.S.A.

Mahalingam, M., et al., "Virtual eXtensible Local Area Network (VXLAN): A Framework for Overlaying Virtualized Layer 2 Networks over Layer 3 Networks," Independent Submission, RFC 7348, Aug. 2014, 22 pages; http://www.hjp.at/doc/rfc/rfc7348.html.

(56) References Cited

OTHER PUBLICATIONS

McQuerry, Steve, "Cisco UCS M-Series Modular Servers for Cloud-Scale Workloads," White Paper, Cisco Systems, Inc., Sep. 2014, 11 pages.

Monia, Charles, et al., IFCP—A Protocol for Internet Fibre Channel Networking, draft-monia-ips-ifcp-00.txt, Dec. 12, 2000, 6 pages.

Mueen, Abdullah, et al., "Online Discovery and Maintenance of Time Series Motifs," KDD'10 The 16th ACM SIGKDD International Conference on Knowledge Discovery and Data Mining, Jul. 25-28, 2010, 10 pages, Washington, DC, U.S.A.

Muglia, Bob, "Decoding SDN," Jan. 14, 2013, Juniper Networks, pp. 1-7, http://forums.juniper.net/t5/The-New-Network/Decoding-SDN/ba-p/174651.

Murray, Joseph F., et al., "Machine Learning Methods for Predicting Failures in Hard Drives: A Multiple-Instance Application," Journal of Machine Learning Research 6 (2005), pp. 783-816; May 2005, 34 pages.

Nelson, Mark, "File Verification Using CRC," Dr. Dobb's Journal, May 1, 1992, pp. 1-18, XP055130883.

Pace, Alberto, "Technologies for Large Data Management in Scientific Computing," International Journal of Modern Physics C., vol. 25, No. 2, Feb. 2014, 72 pages.

Pinheiro, Eduardo, et al., "Failure Trends in a Large Disk Drive Population," FAST '07, $5^{th}$ USENIX Conference on File and Storage Technologies, Feb. 13-16, 2007, 13 pages, San Jose, California, U.S.A.

Raginsky, Maxim, et al., "Sequential Anomaly Detection in the Presence of Noise and Limited Feedback," arXiv:0911.2904v4 [cs.LG] Mar. 13, 2012, 19 pages.

Saidi, Ali G., et al., "Performance Validation of Network-Intensive Workloads on a Full-System Simulator," Interaction between Operating System and Computer Architecture Workshop, (IOSCA 2005), Austin, Texas, Oct. 2005, 10 pages.

Sajassi, A., et al., "BGP MPLS Based Ethernet VPN," Network Working Group, Oct. 18, 2014, 52 pages.

Sajassi, Ali, et al., "A Network Virtualization Overlay Solution using EVPN," L2VPN Workgroup, Nov. 10, 2014, 24 pages; http://tools.ietf.org/pdf/draft-ietf-bess-evpn-overlay-00.pdf.

Sajassi, Ali, et al., "Integrated Routing and Bridging in EVPN," L2VPN Workgroup, Nov. 11, 2014, 26 pages; http://tools.ietf.org/pdf/draft-ietf-bes-evpn-inter-subnet-forwarding-00.pdf.

Schroeder, Bianca, et al., "Disk failures in the real world: What does an MTTF of 1,000,000 hours mean to you?" FAST '07: $5^{th}$ USENIX Conference on File and Storage Technologies, Feb. 13-16, 2007, 16 pages, San Jose, California, U.S.A.

Shue, David, et al., "Performance Isolation and Fairness for Multi-Tenant Cloud Storage," USENIX Association, $10^{th}$ USENIX Symposium on Operating Systems Design Implementation (OSDI '12), 2012, 14 pages; https://www.usenix.org/system/files/conference/osdi12/osdi12-final-215.pdf.

Staimer, Marc, "Inside Cisco Systems' Unified Computing System," Dragon Slayer Consulting, Jul. 2009, 5 pages.

Swami, Vijay, "Simplifying SAN Management for VMWare Boot from SAN, Utilizing Cisco UCS and Palo," posted May 31, 2011, 6 pages.

Tate, Jon, et al., "Introduction to Storage Area Networks and System Networking," Dec. 2017, 302 pages, ibm.com/redbooks.

Vuppala, Vibhavasu, et al., "Layer-3 Switching Using Virtual Network Ports," Computer Communications and Networks, 1999, Proceedings, Eight International Conference in Boston, MA, USA, Oct. 11-13, 1999, Piscataway, NJ, USA, IEEE, ISBN: 0-7803-5794-9, pp. 642-648.

Weil, Sage A., "CEPH: Reliable, Scalable, and High-Performance Distributed Storage," Dec. 2007, 239 pages, University of California, Santa Cruz.

Zhou, Zihan, et al., "Stable Principal Component Pursuit," arXiv:1001.2363v1 [cs.IT], Jan. 14, 2010, 5 pages.

Zhu, Yunfeng, et al., "A Cost-based Heterogeneous Recovery Scheme for Distributed Storage Systems with RAID-6 Codes," University of Science & Technology of China, 2012, 12 pages.

Aweya, James, et al., "Multi-level active queue management with dynamic thresholds," Elsevier, Computer Communications 25 (2002) pp. 756-771.

Petersen, Chris, "Introducing Lightning: A flexible NVMe JBOF," Mar. 9, 2016, 6 pages.

* cited by examiner

| | 302 | 304 | 306 | 308 | 310 |
|---|---|---|---|---|---|
| | LOGICAL DISK ID | STORAGE DEVICE ID | READ IMPACT FACTOR | WRITE IMPACT FACTOR | LATENCY (ms) |
| 312 | | | | | |
| 314 | 1 | 1 | 2 | 5 | 11 |
| 316 | 1 | 2 | 2 | 5 | 19 |
| 318 | 1 | 3 | 1 | 5 | 16 |
| 320 | 2 | 3 | 1 | 2 | 16 |
| 322 | 2 | 4 | 1 | 2 | 9 |
| | 2 | 5 | 1 | 2 | 4 |

# PERFORMANCE OF OBJECT STORAGE SYSTEM BY RECONFIGURING STORAGE DEVICES BASED ON LATENCY THAT INCLUDES IDENTIFYING A NUMBER OF FRAGMENTS THAT HAS A PARTICULAR STORAGE DEVICE AS ITS PRIMARY STORAGE DEVICE AND ANOTHER NUMBER OF FRAGMENTS THAT HAS SAID PARTICULAR STORAGE DEVICE AS ITS REPLICA STORAGE DEVICE

TECHNICAL FIELD

This disclosure relates in general to the field of communications and, more particularly, to improving performance of object storage systems.

BACKGROUND

Data storage is a primary function performed by even the most rudimentary computing systems. Data is often stored in binary form (e.g., a string of bits, each of which is either a zero or a one). Binary data can be encoded by using a particular pattern to correspond to individual alphanumeric characters, media, and other digital groupings. However, since humans cannot easily read stored binary data or encoded data, the data is grouped into files, each of which is given a human-readable name. Files are managed by a file system. There exist myriad file storage systems for storing the files upon which the file system is built. For example, some file storage systems directly store files in a local storage disk while others distribute files to one or more remote storage disks. In object storage systems, each file is split into several portions, called objects, before being stored.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which.

DESCRIPTION OF EXAMPLE EMBODIMENTS OF THE DISCLOSURE

Overview

Example Embodiments

Figure 1:
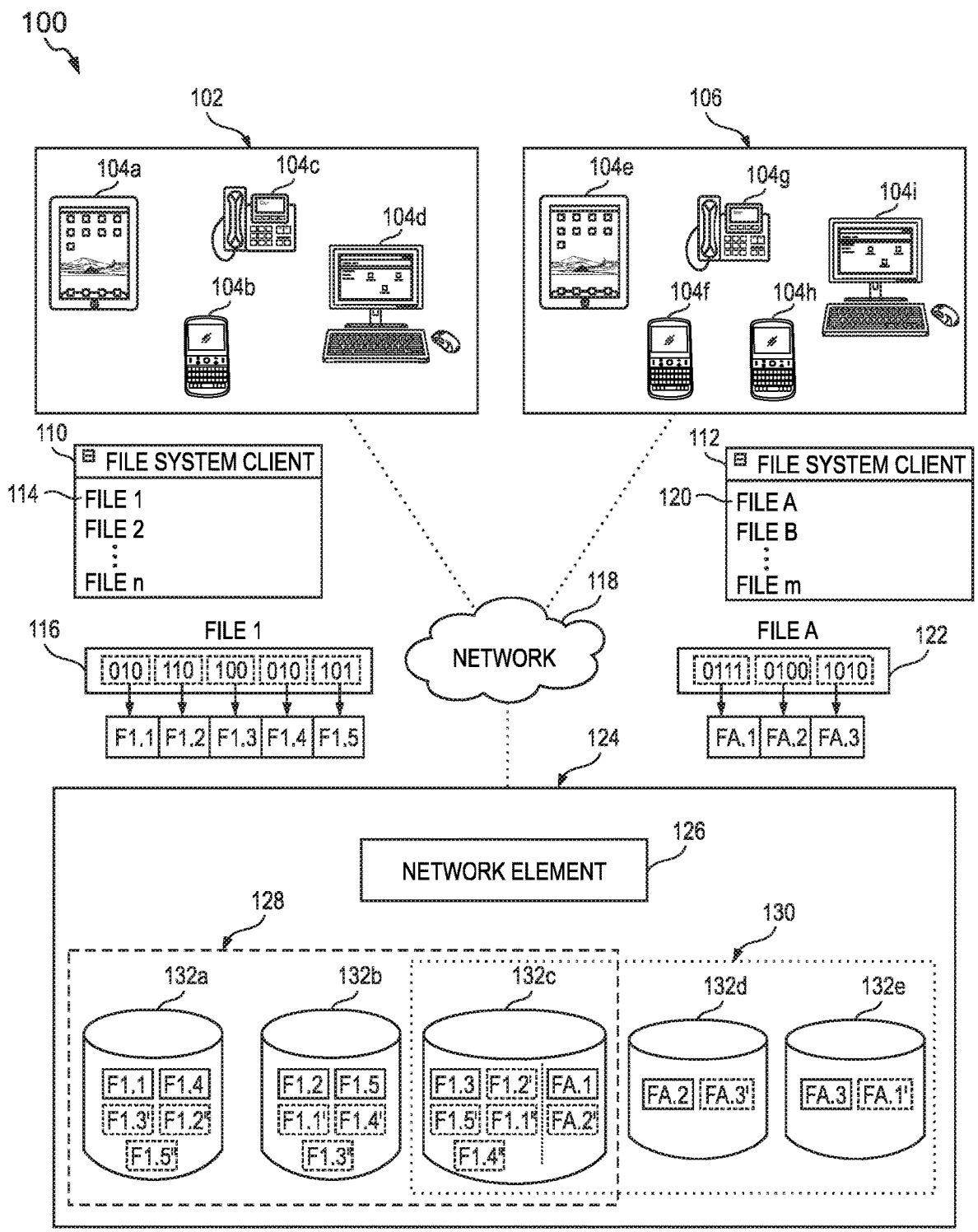
FIG. 1 is a simplified schematic diagram of a system comprising an object storage system (OSS) in which fragments of a file (i.e., objects) are stored in logical disks.

Some file storage systems store each complete and unmodified file in a contiguous block of memory in a storage disk. However, some object storage systems use a process, sometimes referred to as data striping, to split each file into several portions, called objects, before storing them in one or more storage devices. In other words, each object is a fragment of a file (e.g., each fragment being a subdivision of the file). It is noted that the terms 'object' and 'fragment' are used interchangeable in the present disclosure. In addition, each object may be replicated on more than one storage device. For example, when writing a file, the file is split into objects and each object may be stored on a storage device (a primary storage device) and a copy of the object may be stored on, e.g., one or more other storage devices (redundant storage devices referred to herein as replica storage devices). It is noted that each object of a single file need not have the same storage device as the primary storage device. Indeed, the objects that comprise a single file may be distributed and replicated across 100s of storage devices. When the file is read from the file system, each object is read only from the primary storage device. Thus, reading and writing an object is asymmetric in that reading the object from an object storage system (OSS) only requires accessing a single storage device (i.e., the primary storage device) while writing an object to the OSS requires accessing a several storage devices (i.e., the primary storage device and each of the replica storage devices). In many systems, it is desirable to keep latency down (e.g., low latency is preferred; high latency is undesirable). In general, this asymmetry causes objects to be read faster (e.g., lower latency) than they are written. Reading and writing files causes repeated reading and writing of objects, which further exacerbates the asymmetry.

An object storage system (OSS) is inclusive of a plurality of object storage devices (OSDs) for storing objects (i.e., the file fragments). An object storage device (OSD) is a storage device (e.g., physical or logical) in which the objects are stored. In many cases, an OSD is a physical storage device (including, e.g., a memory, a processor, a cache) but may also be inclusive of a logical disk (based on several physical devices or partitions of a single physical device). An OSD is a primary storage unit of an OSS. An OSD can include a client (e.g., code, software) that can be executed by an endpoint to access a logical disk using a file system interface. A 'logical disk' is inclusive of a virtual storage device that provides access to memory that is located on one or more physical storage devices. For example, a logical disk may include memory from several different physical devices, each of which may be co-located (e.g., in a single data center) or may be remote from another (e.g., in different data centers). In addition, each physical device may have multiple partitions of memory each of which are can be used, by itself, as a logical disk or can be used in combination with memory from other storage devices to form the logical disk.

One problem that arises in file systems is how to determine the latency of a disk on which the files are stored. Computing latency is trivial for file systems that store files only on a local storage disk. Moreover, such calculations may be unnecessary since the disk is local and the files can be stored in a contiguous block of memory. For file systems that store (all) files of the logical disk in a single remote disk, the latency of the logical disk is simply the latency of the single remote disk. For file systems that store files in multiple remote disks, latency can be determined based on a latency of each remote disk and a weight value that accounts for a proportion of the logical disk stored in each remote disk. For example, the logical disk may store files in two remote disks, where 20 percent of the files of are stored in a first disk and 80 percent of the files are stored in a second disk. In such a case, the latency of the logical disk may be calculated as 0.2*(latency of the first disk)+0.8*(latency of the second disk). However, it is much more complicated to determine the latency of a logical disk for which the data is stored in an object storage system (e.g., based on the asymmetry of the reads/writes of objects) and the large number of storage devices that may be used for a single file. Thus, an objective technical problem is to determine the latency of a logical disk that asymmetrically reads object from and writes objects to the logical disk.

A file system may utilize an object storage system (OSS) as an underlying data storage system. For example, a service provider (or operator) may provide data storage as a service to endpoints using an OSS. Each endpoint may be associated with an entity (e.g., an individual or an organization). A tenant refers an entity associated with one or more endpoints each of which can receive, as a service from the service provider, access to the file system and/or the OSS. Each endpoint is associated with (e.g., belongs to and/or is operated by) at least one entity. As an example, a company (i.e., an organization that is a tenant of the service provider) may provide each of its employees with a mobile device (i.e., an endpoint). Each endpoint may acquire (e.g., download), from the service provider, a client module (e.g., code, software), which, when executed by the endpoint, generates a file system interface based on objects stored in the OSS. Thus, from the perspective of any endpoint that uses the client module and/or the file system interface to access the file system, the (complete and unmodified) files appear to be stored in a single directory. However, on the backend of the file system, each file is fragmented into objects and is stored across one or more storage devices.

The term 'endpoint' is inclusive of devices used to initiate a communication, such as a computer, a personal digital assistant (PDA), a laptop or electronic notebook, a cellular telephone (e.g., an IPHONE, an IP phone, a BLACKBERRY, a GOOGLE DROID), a tablet (e.g., an IPAD), or any other device, component, element, network element, or object capable of initiating voice, audio, video, media, and/or data exchanges within system 100 (described below). An endpoint may also be inclusive of a suitable interface to the human user, such as a microphone, a display, or a keyboard or other terminal equipment. An endpoint may also be any device that seeks to initiate a communication on behalf of another entity or element, such as a program, a conferencing device, a database, or any other component, device, element, or object capable of initiating an exchange within the system 100. Furthermore, endpoints can be associated with individuals, clients, customers, or end users. Data, as used herein in this document, refers to any type of numeric, voice, messages, video, media, or script data, or any type of source or object code, or any other suitable information in any appropriate format that may be communicated from one point to another.

FIG. 1 illustrates an object storage system (OSS) used as a data storage system that underlies a file system. In particular, FIG. 1 illustrates, among other things, a system (i.e., system 100) comprising an object storage system (OSS) in which fragments of a file (i.e., objects) are stored in logical disks. The system 100 comprises tenants 102 and 106, file system interfaces 110 and 112, files 116 and 122, network 118, and data center 124. Each of the tenants 102 and 106 comprise a plurality of endpoints 104. The tenant 102 comprises endpoints 104a, 104b, 104c, and 104d. The tenant 106 comprises endpoints 104e, 104f, 104g, 104h, and 104i. Each of the endpoints 104a-104i (collectively referred to as endpoints 104) can access logical disks via a file system client interface (i.e., file system client interfaces 110 and 114). The endpoints 104 utilize the file system interfaces 110 or 112 to access (over the network 118) the files (e.g., files 116 or 112) from logical disks in the data center 124. The data center 124 comprises a network element 124 coupled to each of storage devices 132a-e. Each of the storage devices 132a-e is a physical storage device and is an object storage device (OSD) in the OSS. Each of the storage devices 132a-e is associated with one or more of logical disks 128 and 130. Fragments of the files are stored distributed across the storage devices 132a-e, which make up logical disks 128 and 130. Each of the logical disks stores fragments of a file in a primary storage device (within the logical disk) and one or more replica storage devices (within the same logical disk). In contrast, each the logical disks retrieves the fragments from the primary storage device and not the one or more replica storage devices. Thus, each logical disk asymmetrically stores fragments in and retrieves fragments from logical disks (e.g., based, at least in part, on retrieving a fragment from the logical drive accesses the storage devices a different number of times than for writing the fragment to the logical drive). It is noted that the data center 124 is illustrated with five storage devices (i.e., 132a-e) only for clarity and simplicity of the figures. In practice, the data center 124 may include any number of storage devices (in some cases of thousands of storage devices).

The network 118 operatively couples the tenants (i.e., 102 and 106) and the data center 124 to one another. The network 118 facilitates two-way communication between any two or more of the components of system 100. For example, each of the endpoints 104 can transmit to and/or receive data from the data center 124 (e.g., the network element 124, logical disks 128 and 138, and/or storage devices 132a-e therein) over the network 118. Within the context of the disclosure, a 'network' represents a series of points, nodes, or network elements of interconnected communication paths for receiving and transmitting packets of information that propagate through a communication system. A network offers communicative interface between sources and/or hosts, and may be any local area network (LAN), wireless local area network (WLAN), metropolitan area network (MAN), Intranet, Extranet, Internet, WAN, virtual private network (VPN), or any other appropriate architecture or system that facilitates communications in a network environment depending on the network topology. A network can comprise any number of hardware or software elements coupled to (and in communication with) each other through a communications medium.

The data center 124 comprises a network element 126 and a plurality of storage devices 132a-132e. The network element 126 and each of the plurality of storage devices 132a-132e are operably coupled to one another by communication channels. The data center 124 includes two logical disks: logical disk 128 and logical disk 130. The logical disks 128 and 130 are associated with at with tenants 120 and 106 respectively. Each tenant is provided with access only to its logical disks (and not to logical disks that are associated with other tenants). The network element 126 may maintain metadata associated with the logical disks. In this example, each tenant is associated with a single logical disk only for clarity of the figures. Each tenant may be associated with any number of logical disks. The metadata may include data mappings that, at least in part, define the logical disks and identify a manner in which the logical disk operates. For example, the network element 126 can store data comprising: a mapping of each storage device to one or more logical disks, a mapping of each tenant to one or more logical disks; a mapping of each tenant to one or more storage devices; a mapping of each logical disk to operational variables that identify a manner in which a logical disk operates. The operational variable may include (but are not limited to): a size of each object to be stored in the logical disk (e.g., measured in bit or multiples thereof), a number of primary storage devices in which each object is to be stored, a number of replica storage devices in which each object is to be stored, pools of storage devices (e.g., subgroups of storage devices within a logical disk) for which one of the storage devices is primary storage device and others of the storage devices are replica storage devices, and/or any other parameters that define (or otherwise specify) a manner in which a logical disk operates. In this example, each of the storage devices 132*a*, 132*b*, and 132*c* is mapped to logical disk 128; each of the storage devices 132*c*, 132*d*, and 132*e* is mapped to logical disk 130; the tenant 102 is mapped to the logical disk 128; the tenant 106 is mapped to the logical disk 130; the logical disk 128 is associated with operational variables including: a fragment size of three bits, one primary storage device for each fragment, two replica storage devices for each fragment; and the logical disk 130 is associated with operational variables including: a fragment size of four bits, one primary storage device for each fragment, and one replica storage device for each fragment. It is noted that each logical disk may be mapped to a single logical disk or to multiple logical disks. In this example, the logical disks 128 and 130 share the storage device 132*c*.

As used herein in this Specification, the term 'network element' is meant to encompass any as servers (physical or virtual), end user devices, routers, switches, cable boxes, gateways, bridges, load balancers, firewalls, inline service nodes, proxies, processors, modules, or any other suitable device, component, element, proprietary appliance, or object operable to exchange, receive, and/or transmit data in a network environment. These network elements may include any suitable hardware, software, components, modules, interfaces, or objects that facilitate the sharing of message queue operations thereof. This may be inclusive of appropriate algorithms and communication protocols that allow for the effective exchange of data or information. Each of the network elements can also include suitable network interfaces for receiving, transmitting, and/or otherwise communicating data or information in a network environment.

In one particular instance, the architecture of the present disclosure can be associated with a service provider deployment. For example, a service provider (e.g., operating the data center 124) may provide the tenants 102 and 106 with access to logical disks 128 and 130 in the data center 124. In other examples, the architecture of the present disclosure would be equally applicable to other communication environments, such as an enterprise wide area network (WAN) deployment. The architecture of the present disclosure may include a configuration capable of transmission control protocol/internet protocol (TCP/IP) communications for the transmission and/or reception of packets in a network.

The dashed lines between the network 118 and the tenants 102 and 106 (and the endpoints 104 therein) and the data center 124 represent communication channels. As used herein, a 'communication channel' encompasses a physical transmission medium (e.g., a wire) or a logical connection (e.g., a radio channel) used to convey information signals (e.g., data, data packets, control packets, messages etc.) from one or more senders (e.g., an tenant, an endpoint, a network element, a storage device, and the like) to one or more receivers (e.g., a second data center, a second message queue, a message consumer, a network element, and the like). Data, as used herein, refers to any type of source or object code, object, fragment of a file, data structure, any type of numeric, voice, messages, video, media, or script data packet, or any other suitable information in any appropriate format that may be communicated from one point to another. A communication channel, as used herein, can include one or more communication links, which may be physical (e.g., wire) or logical (e.g., data link, wireless link, etc.). Termination points of communication channels can include network interfaces such as Ethernet ports, serial ports, etc. In some examples, each communication channel may be a single channel: deployed for both control messages (i.e., instructions to control a network element, a logical disk, and/or a storage device) and data messages (i.e., messages that include objects for storage in one or more storage devices).

The file system interfaces 110 and 112 are a graphical user interface for the file system that stores files in logical disks 128 and 130 (respectively) in the data center 124. Each of the endpoints 104 executes a code block to generate the file system Interface (i.e., interface 110 or 112) through which the endpoint can access the files in the file system. Each of the tenants is provided with access to one or more logical disks in the data center. Tenants have a corresponding customized file system interface through which to access to their logical disks (e.g., the interfaces are customized on a per-tenant basis). The file system interface 110 renders filenames (i.e., filenames "FILE 1", "FILE 2", . . . , "FILE n") for a directory location in the logical disk 128 associated with the tenant 102. The file system Interface 112 renders filenames (i.e., filenames "FILE A", "FILE B", . . . , "FILE m") for a directory location in the logical disk 130 associated with the tenant 106. Each of the filenames corresponds to a file. The filename 114 corresponds to file 116. The filename 120 corresponds to file 122. Within the file system interfaces 110 and 112, files appear to be complete, unmodified, and stored in a single directory. Thus, from the perspective of any of the endpoints 104 that use the file system interface, the (complete and unmodified) files appear to be stored in a single directory. However, within the data center 124, each file is fragmented into objects and is stored across one or more storage devices.

For example, each of the files 116 and 122 is fragmented into objects; the objects are stored distributed and replicated across several storage devices in a logical disk. The file 116 is named "FILE 1" and corresponds to the filename 114 in the file system interface 110. The file 122 is named "FILE A" and corresponds to the filename 120 in the file system interface 112. Each of the files 116 and 122 is stored, at least in part, in binary form. The files may be further encoded in a standardized encoding (e.g., ASCII, Unicode, BinHex, Uuencode, Multipurpose Internet Mail Extensions (MIME), multimedia encoding such as audio and/or video encoding) or a propriety encoding (e.g., a proprietary file type generated by proprietary software). The files are split into objects. Each object is a fragment of the file. A size of the objects (e.g., measured in bit, bytes, or any multiple thereof) is configurable (e.g., by an endpoint, a network element, and/or other computing element with administrative rights). Thus, each service provider, each tenant, each endpoint, and the like may customize the size of the object. In the example of system 100, one of the endpoints 104a-d has set the size of the object to 3 bits for all files associated with the tenant 102; one of the endpoints 104e-i has set the size of the object to 4 bits for all files associated with the tenant 106. The files 116 and 122 are split into objects based, at least in part, on the size of the object set for the corresponding tenant. The file 116 (i.e., "FILE 1") is split into five 3-bit objects (labeled "F1.1", "F1.2", "F1.3", "F1.4", and "F1.5"). The file 122 (i.e., "FILE A") is split into three 4-bit objects (labeled "FA.1", "FA.2", and "FA.3"). Each object (i.e., each fragment of the file) is asymmetrically stored in and retrieved from storage devices in the data center 124.

Each fragment of a file is asymmetrically stored in and retrieved from storage devices in the data center 124. Each fragment being stored in multiple storage devices makes the logical disk robust. A failure of any of the storage devices is less likely to cause a complete loss of any file or fragment thereof at least because each fragment is redundantly stored in multiples storage devices. If a storage device fails, copies of fragments stored on others of the storage devices can be used to reassign a primary and/or additional replica storage devices as needed. Each fragment is assigned a primary storage device and one or more replica storage devices from the storage devices associated with a logical disk. A primary storage device stores its assigned fragments and, when they are requested from the logical disk, the primary storage device retrieves the assigned fragments and transmits them to the requesting component. A replica storage device stores its assigned fragments and but is not responsible for retrieving the assigned fragments in response to requests. In other words, while the each fragment is stored in multiple storage devices (i.e., the primary and the replica storage devices) only one of the multiple storage devices responds to requests to read the fragment. Writing a fragment to the logical disk requires activity from several storage devices (i.e., the primary storage device and each of the replica storage devices) while reading the fragment from the logical disk only requires activity from the a single storage device (i.e., the primary storage device). Retrieving an object from the logical drive accesses the storage devices a different number of times than for writing the object to the logical drive.

Each object is stored in a primary storage device and one or more replica storage devices. In FIG. 1, the object, when stored in the primary storage device, is illustrated as a solid rectangle and, when stored in the replica storage devices, is illustrated as a dashed or dotted rectangle. A first copy of each object is labeled with a prime symbol ('); a second copy of each object is labeled with a double prime symbol ("). The file 116 (i.e., "FILE 1") is split into five 3-bit objects (labeled "F1.1", "F1.2", "F1.3", "F1.4", and "F1.5") and stored in the logical disk 128. The logical disk 128 comprises storage disks 132a and 132b and at least a portion of the storage disk 132c. Each object of File 1 is stored in a primary storage device and two replica storage devices. For example, for the object F1.1, the storage device 132a is the primary storage device (storing the object F1.1); the storage device 132b is a first replica storage device (storing the first copy F1.1'); and the storage device 132c is a second replica storage device (storing the first copy F1.1"). Table 1 below summarizes the primary storage devices and replica storage devices for each of the objects parsed from the FILE 1.

TABLE 1

Summary of primary storage devices and replica storage devices in the logical disk 128 for each of the objects parsed from the FILE 1.

| Object | Primary | First Replica | Second Replica |
|--------|---------|---------------|----------------|
| F1.1 | 132a | 132b | 132c |
| F1.2 | 132b | 132c | 132a |
| F1.3 | 132c | 132a | 132b |
| F1.4 | 132a | 132b | 132c |
| F1.5 | 132b | 132c | 132a |

The file 122 (i.e., "FILE A") is split into three 4-bit objects (labeled "FA.1", "FA.2", and "FA.3") and stored in the logical disk 130. The logical disk 130 comprises storage disks 132d and 132e and at least a portion of the storage disk 132c. Each object of File A is stored in a primary storage device and a replica storage device. For example, for the object FA.1, the storage device 132c is the primary storage device (storing the object FA.1); and the storage device 132e is a first replica storage device (storing the first copy FA.1'). Table 2 below summarizes the primary storage devices and replica storage devices for each of the objects parsed from the FILE A.

TABLE 2

Summary of primary storage devices and replica storage devices in the logical disk 130 for each of the objects parsed from the FILE A.

| Object | Primary | First Replica |
|--------|---------|---------------|
| FA.1 | 132c | 132e |
| FA.2 | 132d | 132c |
| FA.3 | 132e | 132d |

As discussed above, an objective technical problem is to determine the latency of a logical disk that asymmetrically reads and writes objects, as is the case for logical disks 128 and 130. The following is a practical example of such a problem. In a cloud computing environment (e.g., the cloud computing software marked under the trade name OpenStack) with an object storage system (e.g., the storage system marketed under the trade name CEPH) as the back-end storage, it is common for an operator (e.g., a service provider) to have difficulties identifying a reason why a tenant's logical disk (e.g., a Ceph volume) is "slow" (i.e., read and/or write operations to the logical disk have a latency that negatively impacts performance of the system and/or is unacceptable to the tenant). When a tenant reports, to the operator, that their logical disk is slow, operators are neither able to validate the report nor identify the reasons for the logical disk being slow. Because the logical disk volume is distributed across potentially thousands of physical disks (e.g., storage devices), isolating the problem to one or more disks can be a challenge.

A potential solution is to empirically determine the latency of a disk. In traditional distributed storage systems, latency can be calculated through experiments based on request and response (completion) of events. This method of latency calculation cannot be applied to determine latency of a logical disk (such as logical disks 128 and 130 of FIG. 1) because the entire logical disk is not read from or written to a single physical disk. Also, calculating latency of a logical disk in object-based storage (e.g., in object storage systems) is challenging because there may be multiple objects belonging to a same logical disk stored in a same storage device. In other words, if all of the objects were retrieved from the logical disk, some of the storage devices would have to retrieve more objects than others of the storage devices. Thus, the storage devices that perform more retrieving would have a higher influence on the performance of the logical disk than the others of the storage devices. Another possible solution is to manually debug a logical disk by manually inspecting each of the associated storage devices to identify any latency issues; this is time consuming, inefficient, and prone to errors and oversights.

A solution, disclosed in the present disclosure, to address the above issues (and others) provides for improving performance of a logical disk by reconfiguring storage devices in the logical disk based on asymmetric reading and writing characteristics of the storage devices. The methods, systems, logic, and/or apparatuses (as disclosed herein) address the above technical problem (and others) by adding and/or removing storage devices from the logical disk based on an influence that each of the exiting storage devices in the logical disk has on the overall performance of the logical disk. In some examples, the methods, systems, logic, and/or apparatuses disclosed herein utilize a number of objects that a storage device is associated with retrieving and a different number of objects that the storage device is associated with storing to determine the influence on the logical disk. In addition, the adding or removing of the storage device can be simulated using a mathematical model of the logical disk to verify whether the addition or removal (as the case may be) of the storage device will improve the performance of the logical disk.

Figure 2:
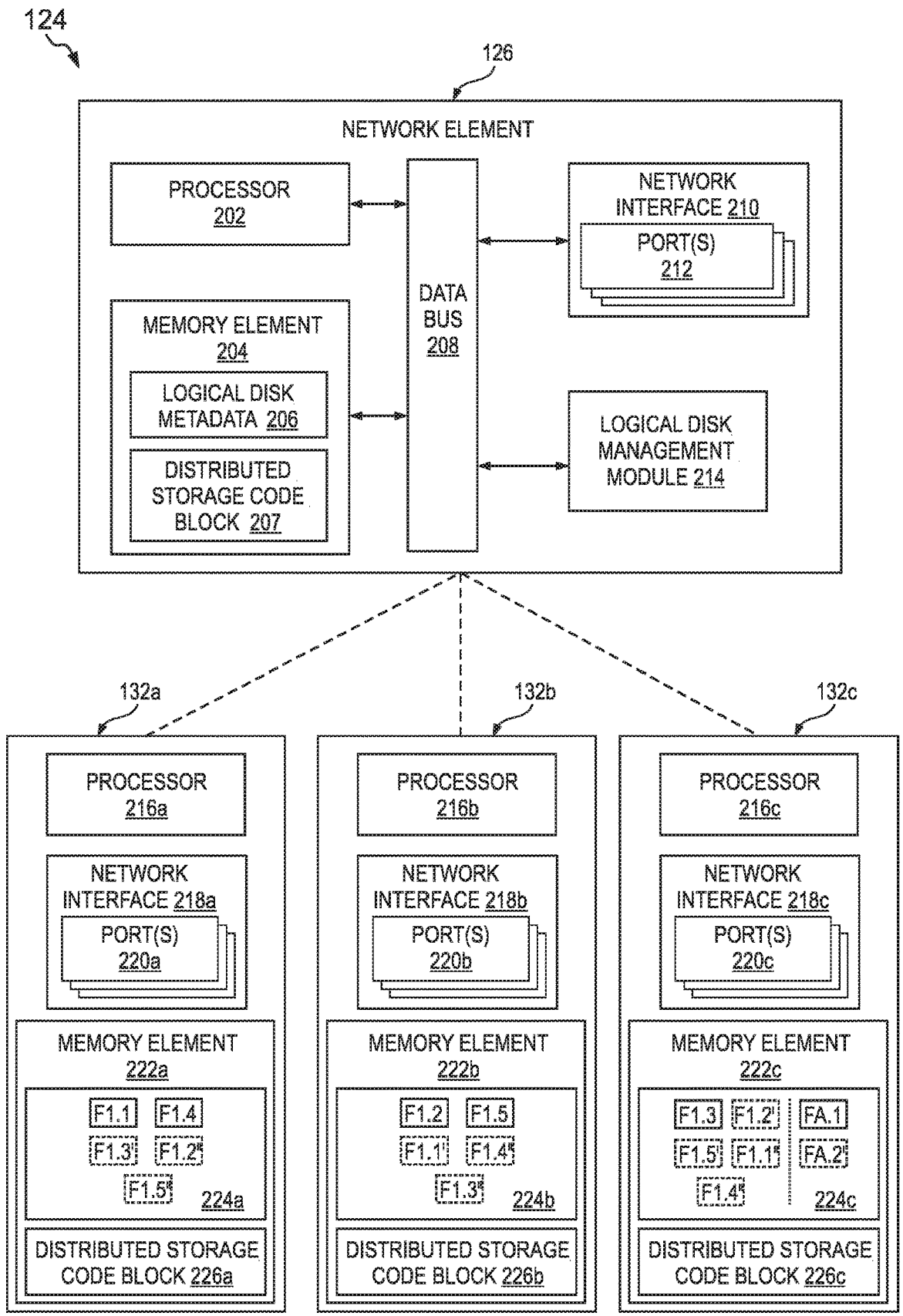
FIG. 2 is a simplified diagram of details of a network element and storage devices in a data center implementing the OSS of FIG. 1.

FIG. 2 is a simplified diagram of details of the network element 126 and storage devices 132a-c in the data center 124 implementing the object storage system (OSS) of FIG. 1. FIG. 2 illustrates a portion of the storage devices 132 (i.e., illustrates storage devices 132a-c and not storage devices 132d-e) only clarity of the Figure.

The network element 126 of FIG. 2 is an example of the network element 126 of FIG. 1 and/or of the server 704 (of FIGS. 7A-7D, which are described below). The network element 126 comprises a processor 202, a memory element 204, a data bus 208, a network interface 210, and a logical disk management module 214. The data bus 208 operably couples the components to one another. The network interface 210 includes a plurality of ports 212, each of which is configured to transmit and/or receive data over a network. The memory element 204 stores, among other things, logical disk metadata 206 and a distributed storage code block 207. The logical disk metadata 206 is inclusive of the mappings (defining the logical disks and/or identifying a manner in which the logical disk operates) described with respect to FIG. 1, the data of Table 1 (of the present disclosure), the data of Table 2 (of the present disclosure), and/or the data of FIG. 3 (which is described below). The processor 202, among other things, executes the distributed storage code block 207 that, at least in part defines and manages an object storage system in the data center 124. When executed, the distributed storage code block 207, can generate control plane messages for communication with corresponding distributed storage code blocks in other components of the logical disk (e.g., distributed storage code block 226a-c in the storage devices 132a-c). Moreover, each distributed storage code block the logical disk may include libraries of functions to operate the OSS (e.g., algorithms for pseudo-randomly distributing objects and copies to storage devices, data striping algorithms for fragmenting a file into objects, and the like). As an example, a distributed storage code block may be client, a daemon, or an operating system for the device to operate within the object storage system. As a further example, each distributed storage code block may be a CEPH daemon (e.g., a Cluster monitor daemon, a metadata server daemon, an object storage device daemon). In such an example, the distributed storage code block 207 may be a metadata server daemon and each of the distributed storage code block 226a-c may be an object storage device daemon. In addition, the processor 202 executes code corresponding to the logical disk management module 214 and accesses data from the memory element 204 to manage, using the code, a logical disk and improve its performance by exploiting the asymmetric reading and writing characteristics of the storage devices of the logical disk. The logical disk management module 214 (and the corresponding code) includes logic for improving the performance of a logical disk.

Each of the storage devices 132a-c comprises respective processors 216a-c, network interfaces 218a-c, and memory elements 222a-c. Each of the network interfaces 218a-c includes a respective plurality of ports 220a-c, each of which is configured to transmit and/or receive data over a network. Each of the memory elements 222a-c stores, among other things, a distributed storage code block 226a-c. The processors 216 execute the distributed storage code blocks 226a, which, at least in part, define and manage an object storage system in the data center 124. When executed, each of the distributed storage code blocks 216a-c, can generate control plane messages for communication with corresponding distributed storage code blocks in other components of the logical disk (e.g., distributed storage code block 207 in the network element 126). Moreover, each distributed storage code block the logical disk may include libraries of functions to operate the OSS (e.g., algorithms for distributing objects to storage devices and/or copying objects to replica storage devices). Each of the storage devices 132a-c has a portion of their memory element dedicated to storing objects. Storage device 132a include memory portion 224a, which stores objects (and copies of objects) associated with files stored in the logical disk 128 of FIG. 1. Storage device 132b include memory portion 224b, which stores objects (and copies of objects) associated with files stored in the logical disk 128 of FIG. 1. Storage device 132c include memory portion 224c, which stores objects (and copies of objects) associated with files stored in the logical disk 128 of FIG. 1. The details of the objects and the copies stored in the logical disk 128 are provided in the Table 1 and the corresponding description; the details are omitted here only for the purpose of brevity of the specification.

Figures 3, 4:
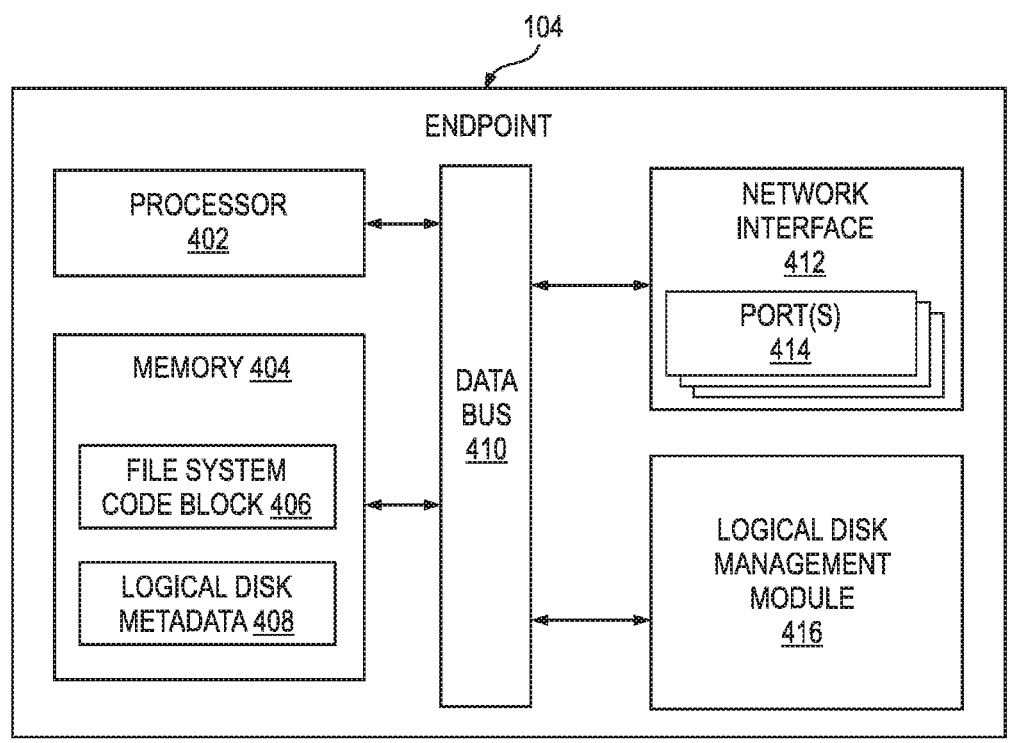
FIG. 3 is a simplified schematic diagram of logical disk metadata.
FIG. 4 is a simplified schematic diagram illustrating an exemplary endpoint.

FIG. 3 is a simplified schematic diagram of logical disk metadata. In this example, the metadata is a table that identifies, for each of a plurality of storage devices, at least one impact factor. The columns of the table 300 include column 302 identifying a logical disk identifier (ID); column 304 identifying a storage device ID; column 306 identifying a read impact factor for the corresponding combination of the logical disk ID and the storage device ID; column 308 identifying a write impact factor the corresponding combination of the logical disk ID and the storage device ID; and column 310 identifying a latency for the corresponding storage device ID (measured in milliseconds, ms).

The table 300 includes metadata corresponding to the storage devices 132a-e and the logical disks 128 and 130 in the data center 124 of FIG. 1. In particular, the logical disk 128 corresponds to the logical disk ID "1"; the logical disk 130 corresponds to the logical disk ID "2"; the storage device 132a corresponds to the storage device ID "1"; the storage device 132b corresponds to the storage device ID "2"; the storage device 132c corresponds to the storage device ID "3"; the storage device 132d corresponds to the storage device ID "4"; and the storage device 132e corresponds to the storage device ID "5".

The row 312 corresponds to metadata associated with the storage device ID 1 (i.e., the storage device 132a) within the context of the logical disk ID 1 (i.e., the logical disk 128). The row 314 corresponds to metadata associated with the storage device ID 2 (i.e., the storage device 132b) within the context of the logical disk ID 1 (i.e., the logical disk 128). The row 316 corresponds to metadata associated with the storage device ID 3 (i.e., the storage device 132c) within the context of the logical disk ID 1 (i.e., the logical disk 128). The row 318 corresponds to metadata associated with the storage device ID 3 (i.e., the storage device 132c) within the context of the logical disk ID 2 (i.e., the logical disk 130). The row 320 corresponds to metadata associated with the storage device ID 4 (i.e., the storage device 132d) within the context of the logical disk ID 2 (i.e., the logical disk 130). The row 322 corresponds to metadata associated with the storage device ID 5 (i.e., the storage device 132e) within the context of the logical disk ID 2 (i.e., the logical disk 130).

Each of the rows of the table 300 identifies a combination of a logical disk ID and a storage device ID and corresponding performance parameters for the combination. The rows identify the combination of the logical disk ID and the storage device ID at least because each storage device may be associated with more than one logical disk. For example, the storage device ID 3 (i.e., the storage device 132c) is associated with both the logical disk IDs 1 and 2 (i.e., the logical disks 128 and 130, respectively) and, as a result, the table 300 contains two rows (i.e., rows 316 and 318) that identify the metadata for the storage device ID 3: one for each of the logical disk IDs 1 and 2.

Each impact factor identifies, on a per logical disk basis, a proportion of objects stored in or retrieved from each of the plurality of storage devices relative to others of the plurality of storage devices based on asymmetrical storage in and retrieval from each of the plurality of storage devices. The impact factors correspond to an influence that each of the storage devices has on the performance (e.g., average latency, amount of throughput, and the like) of the logical disks to which the storage device is associated. For example, as the amount of throughput (e.g., a computational load) on each storage device increases, the latency of each storage device increases because it takes more the time to process each read/write request than if the amount of throughput were reduced.

A network element (e.g., a server, such as a metadata server in a CEPH system), may calculate the impact factors by, at least in part, counting a number of objects for which each of the plurality of storage devices is a primary storage device and/or a replica storage device.

The read impact factor (i.e., in column 306) identifies a number of objects for which each of the storage devices is a primary storage device within the context of a logical disk. The network element may calculate the read impact factor based on metadata associated with the logical disk and/or data retrieved from the storage devices. For example, the network element may utilize metadata including the data of Tables 1 and 2 of the present disclosure to count the number of objects for which each of the storage devices is a primary storage device within the context of a logical disk. In other examples, the network element may transmit to each storage device in a logical disk a request for a read impact factor. The request for the read impact factor may be for a single file, multiple files, or for all files for which the storage device stores objects (based on identifiers of files and/or objects in the request). The request may also identify a particular logical disk for which the impact factor is requested (e.g., since the impact factor may be different for each logical disk to which the storage device is associated).

Assuming, only for the sake of an simple example, that each logical disk only stores a single file (e.g., FILE 1 or File A), the read impact factor for each device is the number times that the storage device is identified in the column labeled "Primary" in Tables 1 and 2 (i.e., the number of objects for which the device is the primary storage device, which responds to read requests for the object). Table 1 includes metadata for the logical disk 128 (logical disk ID 1 in FIG. 3). The storage device 132a (storage device ID 1 in Table 300 of FIG. 3) is listed twice in the "Primary" column in Table 1 (for objects F1.1 and F1.4), which corresponds to the read impact factor of 2 in row 312 of table 300 in FIG. 3. The storage device 132b (storage device ID 2 in Table 300 of FIG. 3) is listed twice in the "Primary" column in Table 1 (for objects F1.2 and F1.5), which corresponds to the read impact factor of 2 in row 314 of table 300 in FIG. 3. The storage device 132c (storage device ID 3 in Table 300 of FIG. 3) is listed once in the "Primary" column in Table 1 (for objects F1.3), which corresponds to the read impact factor of 1 in row 316 of table 300 in FIG. 3. Table 2 includes metadata for the logical disk 130 (logical disk ID 2 in FIG. 3). The storage device 132c (storage device ID 3 in table 300 of FIG. 3) is listed once in the "Primary" column in Table 2 (for objects FA.1), which corresponds to the read impact factor of 1 in row 318 of table 300 in FIG. 3. The read impact factors of 1 in rows 320 and 322 of table 300 (for storage devices 132d and 132e (storage device IDs 4 and 5), respectively) are calculated in a manner similar to that for row 318.

The above process is described with respect to calculating the read impact factor of various storage devices for a single file. Object storage systems often store many files. The impact factor for all of the files in the logical disk may be calculating by repeating, for each file in the logical disk, the above-described process of calculating impact factors for a single file. The overall read impact factor for each storage devices in the logical disk may be calculated by summing the individual read impact factors (for each file) for each storage device to determine.

The write impact factor (i.e., in column 308) identifies a sum of: a first number of objects for which each of the storage devices is a primary storage device, and a second number of objects for which each of the storage devices is a replica storage device. A network element may calculate the write impact factor based on metadata associated with the logical disk and/or data retrieved from the storage devices. For example, the network element may utilize metadata including the data of Tables 1 and 2 of the present disclosure to count the number of objects for which each of the storage devices is a primary storage device and the number of objects for which each of the storage devices is a replica storage device within the context of a logical disk. In other examples, the network element may transmit to each storage device in a logical disk a request for a write impact factor. The request for the write impact factor may be for a single file, multiple files, or for all files for which the storage device stores objects (based on identifiers of files and/or objects in the request). The request may also identify a particular logical disk for which the impact factor is requested (e.g., since the impact factor may be different for each logical disk to which the storage device is associated).

The following example assumes (only for the sake of a simple example) that each logical disk only stores a single file (e.g., FILE 1 or File A). In such an example, the write impact factor for each device is the sum of (1) a number times that the storage device is identified in the column labeled "Primary" in Tables 1 and 2 (i.e., the number of objects for which the device is the primary storage device), and (2) a number times that the storage device is identified in any of the remaining "Replica" columns in Tables 1 and 2 (i.e., the number of objects for which the device is a replica storage device, which responds to write requests for the object). Table 1 includes metadata for the logical disk 128 (logical disk ID 1 in FIG. 3). The storage device 132a (storage device ID 1 in table 300 of FIG. 3) is listed twice in the "Primary" column in Table 1 (for objects F1.1 and F1.4) and is listed three times in the "Replica" columns in Table 1 (first replica for object F1.3 and second replica for objects F1.2 and F1.5); this corresponds to the write impact factor of (2+3) 5 in row 312 of table 300 in FIG. 3. The write impact factors of 5 in rows 314 and 316 of table 300 (for storage devices 132b and 132c (storage device IDs 2 and 3), respectively) are calculated in a manner similar to that for row 312. Table 2 includes metadata for the logical disk 130 (logical disk ID 2 in FIG. 3). The storage device 132c (storage device ID 3 in table 300 of FIG. 3) is listed once in the "Primary" column in Table 2 (for objects FA.1) and is listed once in the "Replica" column in Table 2 (for object FA.2); this corresponds to the write impact factor of (1+1) 2 in row 318 of table 300 in FIG. 3; this corresponds to the read impact factor of 1 in row 318 of table 300 in FIG. 3. The read impact factors of 1 in rows 320 and 322 of table 300 of table 300 (for storage devices 132d and 132e (storage device IDs 4 and 5), respectively) are calculated in a manner similar to that for row 318.

The impact factors are attributes that can be used to determine the influence that each storage device has on a logical disk by accounting for asymmetric read and write operations of the storage device. Other attributes may be used to determine the influence that each storage device has on a logical disk. Other attributes may include (but are not limited to) any one or more of the following attributes of a storage device: a number of pending operations (e.g., a number of operations in a queue of operations to be performed by the storage device), a number of stored objects (e.g., a total number of objects stored by the storage device across all of the logical disks with which it is associated), total number of logical disks using the storage device, and/or system metrics (e.g., performance parameters, a latency of input/output ("I/O") operations measured during a window of time, current processor utilization, current memory utilization, and the like). For example, as the current utilization of the processor (e.g., percent of processor capacity utilized by currently executing processes) increases for each storage device, the influence that each storage device has on latency of the logical disk increases because it takes more the time for each storage device to process each read/write request than if the current utilization were reduced.

The attributes may be requested directly from each storage device or may be calculated. In the example of latency, a latency of I/O operations performed by a storage device may be calculated by dividing a number of operations performed by the storage device (during in a window of time) divided by the length of time interval (e.g., measured seconds, minutes, or multiples thereof) to get average latency of the I/O operations. In some examples, the window of time is a moving time window (e.g., a most recent window of 15 minutes, 30 minutes, 1 hour, and the like).

After the attributes are collected for (e.g., calculated and/or retrieved from) each of the storage devices in a logical disk known, a numerical representation of an influence that each storage device has on operational performance the logical disk is determined. The numerical representation corresponds to a proportion of the operational performance of the logical device that is attributable to each of the plurality of storage devices based, at least in part, on the attributes of each of the storage devices. The numerical representation of the influence of each storage device may be determined using a mathematical model. In some examples, the numerical representation is a weighting factor for each of the plurality of storage devices.

A weighting factor for each of the storage devices can be calculated based one or more of the attributes of the each of the storage devices. The weighing factors may be percentage values that correspond to the asymmetric reading and writing characteristics of the storage devices of the logical disk. A weighting factor for a storage device is determined, at least in part, based on an impact factor of the storage device. In some examples, the weighting factor is determined based only on the impact factor(s). The following illustrates example calculations for determining the weighting factors is determined based only on impact factors. Weighting factors are calculated in the context of a logical disk (e.g., on a per-logical disk basis). Returning to table 300 of FIG. 3, the rows 312, 314, and 316 identify metadata for the logical disk ID 1 (logical disk 128 of FIG. 1) and the rows 318, 320, and 322 identify metadata for the logical disk ID 2 (logical disk 130 of FIG. 1). Example weighting factors (e.g., percentage values) for the logical disk ID 1 can be determined by dividing each impact factor by the sum of all of the impact factors (i.e., summing all of the read and write impact factors together ting factors). The sum of all of the read and write impact factors for logical disk ID 1 is 2+2+1+5+5+5=20 (the logical disk sum). The sum of the read and write impact factors for a storage device is divided by the logical disk sum to determine the weighting factor. Thus, the weighting factor for the storage device ID 1 (i.e., row 312) is (2+5)/20=7/20=0.35 (i.e. the sum of the read impact factor and the write impact factor, divided by logical disk sum). The weighting factor for the storage device ID 2 (i.e., row 314) is (2+5)/20=7/20=0.35. The weighting factor for the storage device ID 3 (i.e., row 316) is (1+5)/20=6/20=0.3. Similarly, the sum of all of the read and write impact factors for logical disk ID 2 is 1+1+1+2+2+2=9 (the logical disk sum). The weighting factor for the storage device ID 3 (i.e., row 318) is (1+2)/9=3/9 0.333. The weighting factor for the storage device ID 4 (i.e., row 320) is (1+2)/9=3/9=0.333. The weighting factor for the storage device ID 5 (i.e., row 322) is (1+2)/9=3/9=0.333. In this example, the weighting factor is a proportion of all of the impact factors (for the logical disk) that is attributable to each storage device (e.g., for each logical disk, sum of the weighing factors is equal to 1). The weighting factors are summarized in Table 3 below.

TABLE 3

Summary of weighting factors for storage devices in Logical Disk IDs 1 and 2.

| Logical Disk ID | Storage Device ID | Weighting Factor |
|---|---|---|
| 1 | 1 | 0.35 |
| 1 | 2 | 0.35 |
| 1 | 3 | 0.3 |
| 2 | 3 | 0.333 |

TABLE 3-continued

Summary of weighting factors for storage devices in Logical Disk IDs 1 and 2.

| Logical Disk ID | Storage Device ID | Weighting Factor |
|---|---|---|
| 2 | 4 | 0.333 |
| 2 | 5 | 0.333 |

In other examples, the weighting factor is determined based on the impact factor(s) in combination with one or more other attributes. For example, a mathematical algorithm (e.g., regression algorithm performing a regression analysis) may be executed on impact factor in combination with one or more other attributes to determine weighting factors for the storage device. As a further example, a simulation may be executed be under various conditions of storage disks (e.g., various pseudo-random distributions of objects across the of storage disks, various numbers of pending operations, and various system metrics). A (theoretical) latency of the logical disk can be determined from such simulations. A regression algorithm may take as input: (1) independent variables or factors (e.g., impact factor(s), number of pending operations, number of stored objects, system metrics, and the like) and dependent variables such as a latency of a logical disk (i.e., determined based on the simulations). The regression algorithm may generate, as output, weights to satisfy the following equation for latency of a logical disk (LDLatency):

LDLatency=sum[WF(i)*LS(i)], for i=1, 2, ..., n; where n is the number of storage devices in the Logical Disk Where LS(i) and the latency of the ith storage device;

WF is the weighting factor for the storage device;

WF=sum[x(j)*f(j)], for j=1, 2, ..., m; where m is the number of factors input for the storage devices; and f(j) is the jth factor for the storage device (e.g., factors such as impact factor(s), number of pending operations, number of stored objects, system metrics, and the like)

x(j) is the jth weight associated with the jth factor.

The regression algorithm is utilized to generate the weights (i.e., x(j)). Once the weights are known, they are used to determine LDLatency in a production environment (for actual storage devices and not simulated storage devices). The mathematical algorithm can be executed on the fly (e.g., in near real-time) and at regular intervals to track the influence of a storage device over time.

The above examples of calculating the weighting factors are provided for illustration purposes only (and do not limit the teaching of the present disclosure). Indeed, the teachings of the present disclosure are equally applicable to any approach of calculating the weighting factors as long as the approach accounts for the asymmetric reading and writing characteristics of the storage devices of the logical disk, as is demonstrated by the above exemplary approaches.

A portion of a performance parameter of a logical device that is attributable to each storage device in the logical device is calculated based, at least in part, on a corresponding performance parameter of each storage device weighted by the corresponding influence. In the example of latency, a weighted latency for a storage device can be calculated based on latency of I/O operations of the storage device and the weighting factor for the storage device. The weighted latency of the storage device is a portion of latency of the logical disks that is attributable to the storage device. For example, the weighted latency of the storage device (WLatency) is calculated by multiplied the weighting factor for the storage device (WF) and the latency of the storage device (LS) (i.e., WLatency=WF*LS). In some examples, the latency of the storage device (LS) is the latency of the I/O operations measured during a window of time. A calculation can be performed for each of a plurality of plurality of storage devices comprising logical disk. In such an example, for each of the plurality of storage devices, the latency of the I/O operations is multiplied by the weighting factor to determine a weighted latency for each of the plurality of storage devices. Table 300 (in FIG. 1) lists, in column 310, an average latency for each of the storage device. The weighted latency for each of the storage devices can be calculated by multiplying the average latency (from table 300) of each storage device by the corresponding weighting factors (from table 3). The weighted latency for the storage device ID 1 (i.e., row 312 of table 300 in FIG. 1) is 11 ms*0.35=3.85 ms. The weighted latency for the storage device ID 2 (i.e., row 314 of table 300 in FIG. 1) is 14 ms*0.35=4.9 ms. The weighted latency for the storage device ID 3 within logical disk ID 1 (i.e., row 316 of table 300 in FIG. 1) is 16 ms*0.3=4.8 ms. The weighted latency for the storage device ID 3 within logical disk ID 2 (i.e., row 318 of table 300 in FIG. 1) is 16 ms*(⅓)=5.333 ms. The weighted latency for the storage device ID 4 (i.e., row 320 of table 300 in FIG. 1) is 9 ms*(⅓)=3 ms. The weighted latency for the storage device ID 5 (i.e., row 322 of table 300 in FIG. 1) is 4 ms*(⅓) 1.333 ms. The weighted latencies are summarized in Table 4 below.

TABLE 4

Summary of weighted latencies for storage devices in Logical Disk IDs 1 and 2.

| Logical Disk ID | Storage Device ID | Weighted Latency (ms) |
|---|---|---|
| 1 | 1 | 3.85 |
| 1 | 2 | 4.9 |
| 1 | 3 | 4.8 |
| 2 | 3 | 5.333 |
| 2 | 4 | 3.0 |
| 2 | 5 | 1.333 |

A performance parameter of a logical disk can be calculated based, at least in part, on corresponding performance parameters each of the storage devices and the weighting factor. Thus, the performance parameter of the logical disk can be calculated by summing the weighted performance parameter for each of the plurality of storage devices in the logical disk. In one example, a latency of the logical disk is calculated by summing the weighted latency for each of the plurality of storage devices in the logical disk. Thus, the latency of a logical disk=sum[W(i)*Latency(i)] (for i=1, 2, ..., n; where n is the number of storage devices in the Logical Disk). For example, the logical disk ID 1 (rows 312, 314, and 316 of FIG. 1) has a calculated latency equal to the sum of the corresponding weighted latencies in table 4; the calculated latency of the logical disk ID 1 is (3.85 ms+4.8 ms+4.9 ms)=13.55 ms. The logical disk ID 2 (rows 318, 320, and 322 of FIG. 1) has a calculated latency equal to the sum of the corresponding weighted latencies in table 4; the calculated latency of the logical disk ID 2 is (5.333 ms+3 ms+1.333 ms)=9.666 ms.

A proportion of the performance parameter of a logical device that is attributable to each of the plurality of storage devices is calculated based, at least in part, an impact factor and a latency of each of the plurality of storage devices. For example, the proportions can be determined using the calculations discussed with respect to tables 3 and 4, which are based on the impact factors and latencies of table 300 of FIG. 1. The portion of the performance parameter attributable to each storage device (e.g., from table 4) can be divided by the performance parameter of the logical disk (e.g., the calculated latency of the logical disk) to identify (for each storage device) the proportion (e.g., percent contribution) of the performance parameter of the logical disk. As described above, the calculated latency of the logical disk ID 1 is 13.55 ms and the calculated latency of the logical disk ID 2 is 9.666 ms. Thus, the proportion of latency for each storage device is the weighted latency (from table 4) divided by the calculated latency of the corresponding logical disk. For the logical disk ID 1, the proportion attributable to storage device ID 1 is (3.85/13.55 ms) 28.4%, the proportion attributable to storage device ID 2 is (4.9/13.55 ms) 36.2%, and the proportion attributable to storage device ID 3 is (4.8/13.55 ms) 35.4%.

When the influence of each of the storage devices on a performance parameter of the logical disk is known, the performance of the logical disk is improved by reconfiguring one or more of the plurality of storage disks based on the influences. For example, a network device or endpoint may automatically (e.g., without any further input or prompting) toggle a storage device on or off and, thereby, improves the overall performance (e.g., reduces latency) of the logical disk.

The performance parameters of each storage device can have an unexpected impact on the performance parameter of the logical disk due to the objects being asymmetrically stored in and retrieved from the storage devices (and/or being pseudo-randomly distributed across the storage devices). In the example of table 300 (FIG. 1), the storage disk ID 3 has the highest latency (i.e., 16 ms) in logical disk ID 1 (i.e., relative to all other storage devices in logical disk ID 1). If the logical disk is reconfigured based only on latency (e.g., removing the storage device with the highest latency), then logical disk ID 3 may be identified for removal from the logical disk. However, the storage disk ID 3 does not contribute the highest proportion of latency to the calculated latency of the logical disk ID 1. Instead, the storage disk ID 2 contributes the highest proportion (i.e., 36.2%) of latency to the calculated latency of the logical disk ID 1 due, at least in part, to the impact factors (and the weighting factor derived therefrom) for the storage disk ID 2. The storage disk ID 2 has a more of an influence on the performance parameter of the logical disk than others of the storage disks.

FIG. 4 is a simplified schematic diagram illustrating an exemplary endpoint (i.e., endpoint 104), according to some embodiments of the present disclosure. The endpoint 104 of FIG. 4 is an example of any of the endpoints 104a-i of FIG. 1 and/or the endpoint 705 of FIGS. 7A-7D. The endpoint 104 comprises a processor 402, a memory element 402, a data bus 410, a network interface 412, and a logical disk management module 416. The data bus 410 operably couples the components to one another. The network interface 412 includes a plurality of ports 414, each of which is configured to transmit and/or receive data over a network. The memory element 402 includes a file system code block 406 and a logical disk metadata 408. The processor 402, among other things, executes the file system code block 406 to access files stored in a logical disk. In some examples, when executed by the processor 404, the file system code block 406 generates a file system interface (e.g., similar to the file system interface 110 or 112 of FIG. 1) for accessing the files stored in the logical disk. In addition, the processor 402 executes code corresponding to the logical disk management module 416 and accesses data from the memory element 404 to manage, using the code, a logical disk and improve its performance by exploiting the asymmetric reading and writing characteristics of the storage devices of the logical disk. The logical disk management module 416 (and the corresponding code) includes logic for improving the performance of a logical disk.

In one implementation, the network elements, endpoints, servers, and/or storage devices, described herein may include software to achieve (or to foster) the functions discussed herein for improving performance of logical disks where the software is executed on one or more processors to carry out the functions. This could include the implementation of instances of file system clients, logical disk metadata, logical disk management modules, distributed storage code blocks, and/or any other suitable element that would foster the activities discussed herein. Additionally, each of these elements can have an internal structure (e.g., a processor, a memory element, etc.) to facilitate some of the operations described herein. In other embodiments, these functions for improving performance of logical disks may be executed externally to these elements, or included in some other network element to achieve the intended functionality. Alternatively, network elements, endpoints, servers, and/or storage devices may include software (or reciprocating software) that can coordinate with other network elements/endpoints in order to achieve the performance improvement functions described herein. In still other embodiments, one or several devices may include any suitable algorithms, hardware, software, components, modules, interfaces, or objects that facilitate the operations thereof.

In certain example implementations, the performance improvement functions outlined herein may be implemented by logic encoded in one or more non-transitory, tangible media (e.g., embedded logic provided in an application specific integrated circuit [ASIC], digital signal processor [DSP] instructions, software [potentially inclusive of object code and source code] to be executed by one or more processors, or other similar machine, etc.). In some of these instances, one or more memory elements can store data used for the operations described herein. This includes the memory element being able to store instructions (e.g., software, code, etc.) that are executed to carry out the activities described in this Specification. The memory element is further configured to store databases such as mapping databases (mapping various aspects of a logical disk to storage devices, clients, or other metadata) to enable performance improvements of a logical disk as disclosed herein. The processor can execute any type of instructions associated with the data to achieve the operations detailed herein in this Specification. In one example, the processor could transform an element or an article (e.g., data) from one state or thing to another state or thing. In another example, the activities outlined herein may be implemented with fixed logic or programmable logic (e.g., software/computer instructions executed by the processor) and the elements identified herein could be some type of a programmable processor, programmable digital logic (e.g., a field programmable gate array [FPGA], an erasable programmable read only memory (EPROM), an electrically erasable programmable ROM (EEPROM)) or an ASIC that includes digital logic, software, code, electronic instructions, or any suitable combination thereof.

Any of the devices disclosed herein (e.g., the network elements, endpoints, servers, storage devices, etc.) can include memory elements for storing information to be used in achieving the performance improvements, as outlined herein. Additionally, each of these devices may include a processor that can execute software or an algorithm to perform the activities as discussed in this Specification. These devices may further keep information in any suitable memory element [random access memory (RAM), ROM, EPROM, EEPROM, ASIC, etc.], software, hardware, or in any other suitable component, device, element, or object where appropriate and based on particular needs. Any of the memory items discussed herein should be construed as being encompassed within the broad term 'memory element.' Similarly, any of the potential processing elements, modules, and machines described in this Specification should be construed as being encompassed within the broad term 'processor.' Each of the devices can also include suitable interfaces for receiving, transmitting, and/or otherwise communicating data or information in a network environment.

Figure 5:
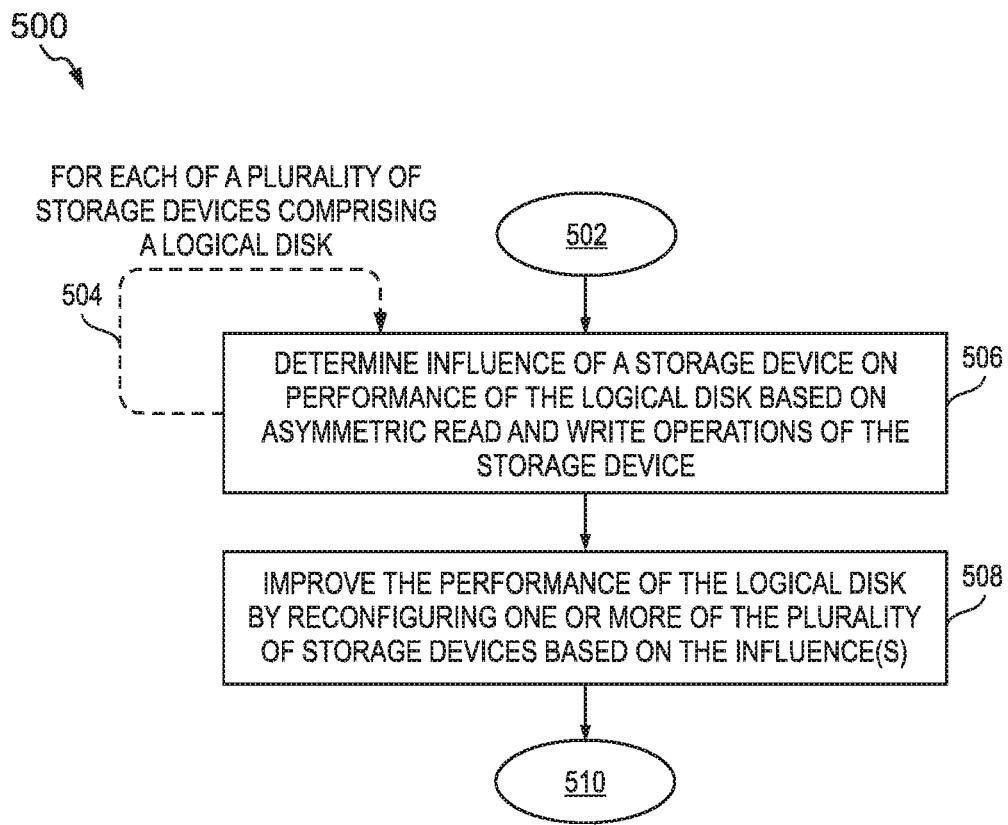
FIG. 5 is a simplified schematic diagram illustrating an exemplary logic for improving the performance of a logical disk according to some embodiments of the present disclosure.

FIG. 5 is a simplified schematic diagram illustrating an exemplary logic (i.e., logic 500) for f according to some embodiments of the present disclosure. Procedure 502 may coincide with a start or end point of other logic, routines, and/or applications. In addition, at 502, data (e.g., data structures, objects, values, variables, etc.) may be initialized, retrieved, or accessed for use in logic 500. At 506, an influence of a storage device on performance of a logical disk based on asymmetric read and write operations of the storage device. As generally indicated by 504, the determination may be made for each of a plurality of storage device that comprise the logical disk. At 508, the performance of the logical disk is improved by reconfiguring one or more of the plurality of storage disks based on the influence(s). The logic 500 ends at 510. 510 may coincide with a start or end point of other logic, routines, and/or applications.

At a high level, the logic 500, when executed, improves the performance of a logical disk. Logic 500 may be implemented in a network element 126 (of FIGS. 1 and 2), and/or endpoint 104 (of FIG. 4). For example, the processor 202 (in the network element 126 of FIG. 2) may execute logic 500 to improve the performance of the logical disk 128 and/or the logical disk 130 (of FIG. 1). As another example, the processor 402 (in endpoint 104 of FIG. 4) may execute logic 500 to improve the performance of a logical disk. Advantageously, the network elements and/or endpoints can use the logic 500 to improve the performance of a logical disk even when the logical disk utilizes an object storage system comprises thousands of storage devices in which fragments of a file (i.e., objects) may be distributed. The logic 500 provides the logical disk with instructions that, when executed, improve the functioning of the logical disk itself (e.g., by improving the performance of the logical disk).

Figure 6:
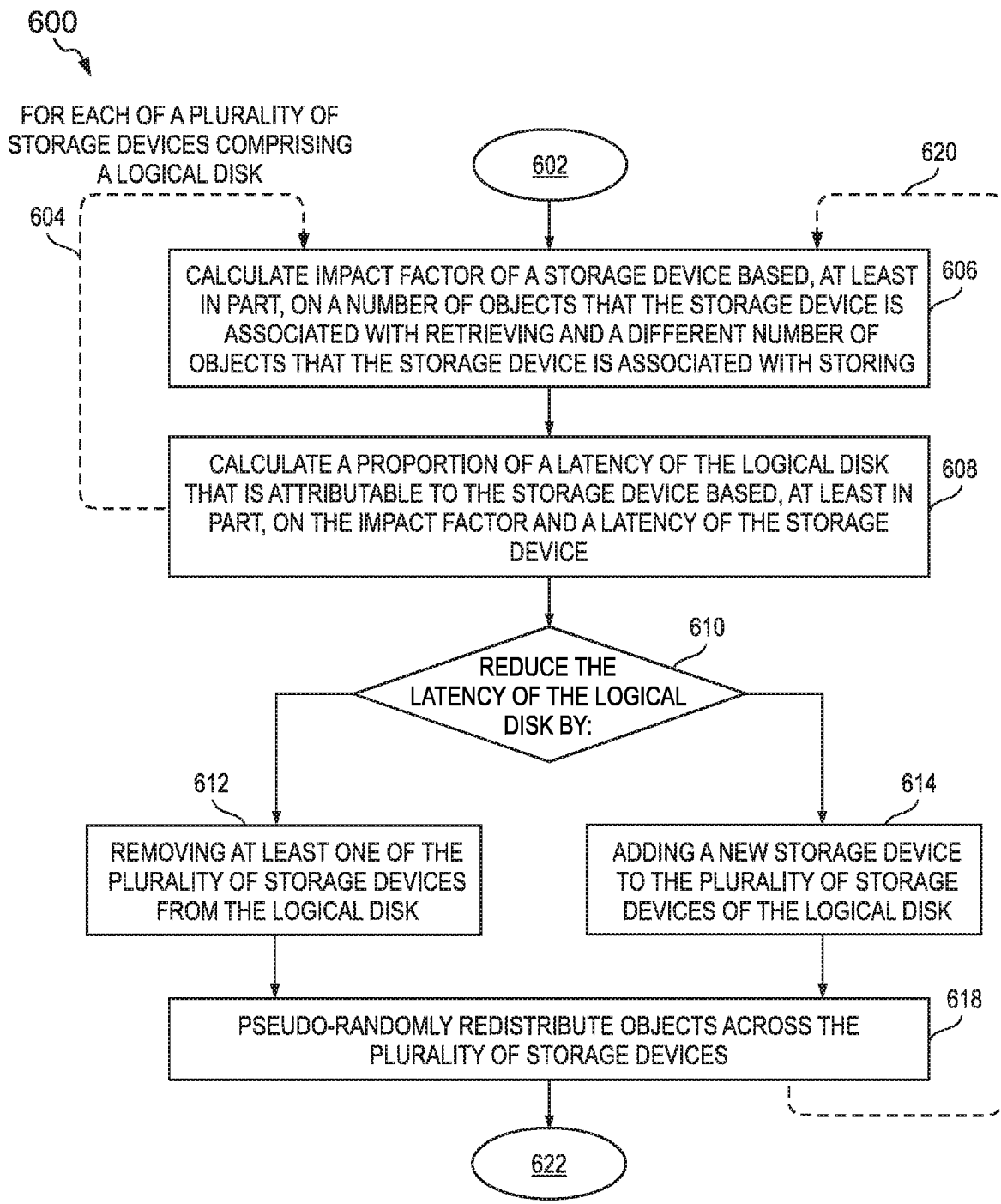
FIG. 6 is a simplified schematic diagram illustrating another exemplary logic for improving the performance of a logical disk by reducing a latency of the logical disk according to some embodiments of the present disclosure.

FIG. 6 is a simplified schematic diagram illustrating an exemplary logic (i.e., logic 600) for improving the performance of a logical disk by reducing a latency of the logical disk according to some embodiments of the present disclosure. Procedure 602 may coincide with a start or end point of other logic, routines, and/or applications. In addition, at 602, data (e.g., data structures, objects, values, variables, etc.) may be initialized, retrieved, or accessed for use in logic 600. At 604, for each of a plurality of storage disks comprising a logical disk. At 606, (at least one) impact factor is calculated for a storage device based, at least in part, on a number of objects that the storage device is associated with retrieving and a different number of objects that the storage device is associated with storing. As generally indicated by 604, the impact factor may be calculated for each of a plurality of storage disks that comprise the logical disk. At 608, calculate a proportion of a latency of the logical device that is attributable to the storage device based, at least in part, on the impact factor and a latency of the storage device. At 610, reduce the latency of the logical disk by removing (612) and/or adding (614) a storage device. The determination of whether to add or remove the maybe based on attributes of the storage devices in the logical disk. In some case, a storage device may be removed due to an operational failure of the storage device (e.g., hardware or software failures identified based on the attributes). In other examples, the storage device may be removed due to its contribution to the performance parameter not meeting a threshold value of the performance parameter associated with the logical disk.

In some embodiments, prior to a storage device being removed from and/or added to the logical disk, any reconfiguration of the logical disk may be simulated. The simulation may utilize a mathematical modeling of the performance of the logical disk to estimate the affect of the reconfiguration on the logical disk. The mathematical model can take, as input, attributes of the storage disks that comprise the logical disk and generate, as output, a performance parameters of the logical disk (including a breakdown of the proportion of the performance parameter attributable to each storage disk). Thus, the mathematical model can be used to determine current performance parameters of the logical disk and simulated performance parameters of the logical disk after the reconfiguring of the logical disk (by simulating objects being redistributed to the reconfigured storage devices). By comparing the current performance parameters to the simulated performance parameters, the behavior of the logical disk can be assessed to assess whether the reconfiguration will improve the performance of the logical disk (e.g., improve the performance by reducing latency). Reconfiguring the logical disk by adding or removing storage devices Ultimately results in the objects of the being redistributed. In the case of adding a storage device, objects are removed from other storage device and added to the new storage devices (e.g., pseudo-randomly selected for reassignment to the new storage device using an algorithm such as CRUSH). During the simulation, the CRUSH algorithm may be used to simulate assigning the objects to a new storage device by only determining a new location for the objects (however, the objects are not actually relocated). When it is determined, based on the simulation, that the reconfiguration will improve the performance of the logical disk, the reconfiguration is implemented (e.g., by adding or removing a storage device and actually relocating the objects). When it is determined, based on the simulation, that the reconfiguration will not improve the performance of the logical disk, the reconfiguration is not implemented. For example, the latency of the logical disk can be estimated using new impact factors derived from a simulated reassignment of objects (e.g., from a storage device that is to be removed from the logical disk). If it is determined, based on the simulation, that the storage device being turned-off meets a performance benchmarks (e.g., reduces latency below a threshold), the storage device is removed from the logical disk. If it is determined, based on the simulation, that the storage device being turned-off does not meet the performance benchmarks (e.g., does not reduce latency below the threshold), the storage device is not removed from the logical disk. Instead, a storage device may be added to the logical disk. Again, before such a reconfiguration is implemented, it may be simulated to assess whether the change would improve the performance of the logical disk.

At 612, at least one of the plurality of storage devices is removed from the logical disk. In embodiments where simulation is used, the simulation may have determined that removing the at least one of the plurality of storage devices improves the performance (performance parameter) of the logical disk. To remove a storage device from the logical disk, the objects on the storage device are relocated from the storage device to others of the plurality of storage devices. For example, all objects associated with files stored in the logical disk may be distributed (e.g., pseudo-randomly or with a distribution skewed in favor of storage devices with the best performance parameters) from the storage device to the others of the storage devices (e.g., using the CRUSH algorithm, or any other algorithm operable to determine locations for the objects). After all the objects associated with files stored in the logical disk are copied to the new locations, they are deleted from the storage device. In addition, the storage device is disassociating from the logical disk. This disassociation may include deleting metadata that associates the storage device with the logical disk (e.g., deleting one or more entries from a mapping of each storage device to one or more logical disks). It is noted that such dissociation from a logical disk need not affect other logical disks that are associated with the storage device. For example, if a storage device is associated with more than one logical disks, the storage device can be dissociated from one logical disks and remain associated with the other logical disks (i.e., disabling is not universal in the data center and is only on a per-logical disk or per-tenant basis). In other examples, the disassociating only by prevents a storage device from being a primary storage device in the logical disk and is only allowed to be a replica storage device in the logical disk. In this way, any "slower" storage device that has a negative effect on performance of the logical disk are only involved in write operations and are not involved in read operations, which can improve the overall performance of the logical disk.

At 614, adding a new storage device to the plurality of storage devices of the logical disk. The new storage device may a new instance of storage device that is added to the logical disk to reduce the load on others of the plurality of storage devices. In some examples, the new storage device is a storage disk that was previously removed (e.g., due to an operational failure) and is, again, added to the logical disk when the operational failure is resolved. As discussed above, in some examples, the addition of the storage device may be simulated to assess whether the addition will likely improve the performance of the storage disk.

At 618, pseudo-randomly redistribute objects across the plurality of storage devices. Such redistributing may be implemented using an algorithm to redistribute the objects. The redistribution occurs both when a storage device is added (to relocate some of the objects to the new storage device) and when a storage device is removed from the logical disk (to remove the objects from the storage device). In embodiments where simulation is used, the locations determined during the simulation may be used to relocate the objects (i.e., the algorithm is not executed again and, instead, the locations from the simulation are used). This has a benefit of causing the actual locations of the objects to match those determined in the simulation and, therefore, increases the likelihood of actual performance parameters matching the simulated performance parameters.

At 620, may loop from 618 back to calculating impact factors (at 606), which may be iterated for each of the plurality of storage disks comprising the logical disk. The logic 600 ends at 622. 622 may coincide with a start or end point of other logic, routines, and/or applications.

At a high level, the logic 600 may be used to reducing latency of a logical disk. Logic 600 may be implemented in a network element 126 (of FIGS. 1 and 2), and/or endpoint 104 (of FIG. 4). For example, the processor 202 (in the network element 126 of FIG. 2) may execute logic 600 to reduce latency of logical disk 128 and/or the logical disk 130 (of FIG. 1). As another example, the processor 402 (in endpoint 104 of FIG. 4) may execute logic 600 to reduce the latency of a logical disk. Advantageously, the network elements and/or endpoints can use the logic 600 to reduce the latency a logical disk even when the logical disk utilizes an object storage system comprises thousands of storage devices in which fragments of a file (i.e., objects) may be distributed. The logic 600 provides a logical disk with instructions that, when executed, improve the functioning of the logical disk itself (e.g., by reducing the latency of the logical disk). Moreover, the logic 600 of FIG. 6 is an example of the logic 500 of FIG. 5. For example, 506 of the logic 500 corresponds to the 606 and 608 of the logic 600; 504 of the logic 500 corresponds to 604 of the logic 600; and 508 of the logic 500 corresponds to 610, 612, 614, and 618 of the logic 600.

It is noted that any device (e.g., endpoint, network element, and the like) may execute logic 500 and/or 600. In some examples, the logic is implemented in instructions in a module (e.g., a logical disk management module) that has administrative rights to reconfigure logical disks. Such a module can be in a central controller, server, client module, and/or distributed to many network elements. For example, a central server (e.g., a network controller), coupled to the logical disk and the storage devices, may execute the logic. In other examples, the logic is distributed in small agents (e.g., administrative client) in servers that are coupled to the logical disk and the storage devices.

FIGS. 7A, 7B, 7C and 7D are simplified diagrams illustrating exemplary data transmissions between components of a system (i.e., system 700) for improving the performance of a logical disk. The system 700 comprises an endpoint 702, a server 704, a first storage device 706 (SD1), a second storage device 708 (SD3), and a third storage device 710 (SD3). The storage devices (i.e., SD1, SD2, and SD3), at least in part, define a logical disk 705. The details (e.g., components and operation) of the endpoints, servers (e.g., network elements), and storage devices are described throughout the present disclosure and are not repeated here only for the purpose of brevity and clarity of the specification.

Figure 7A:
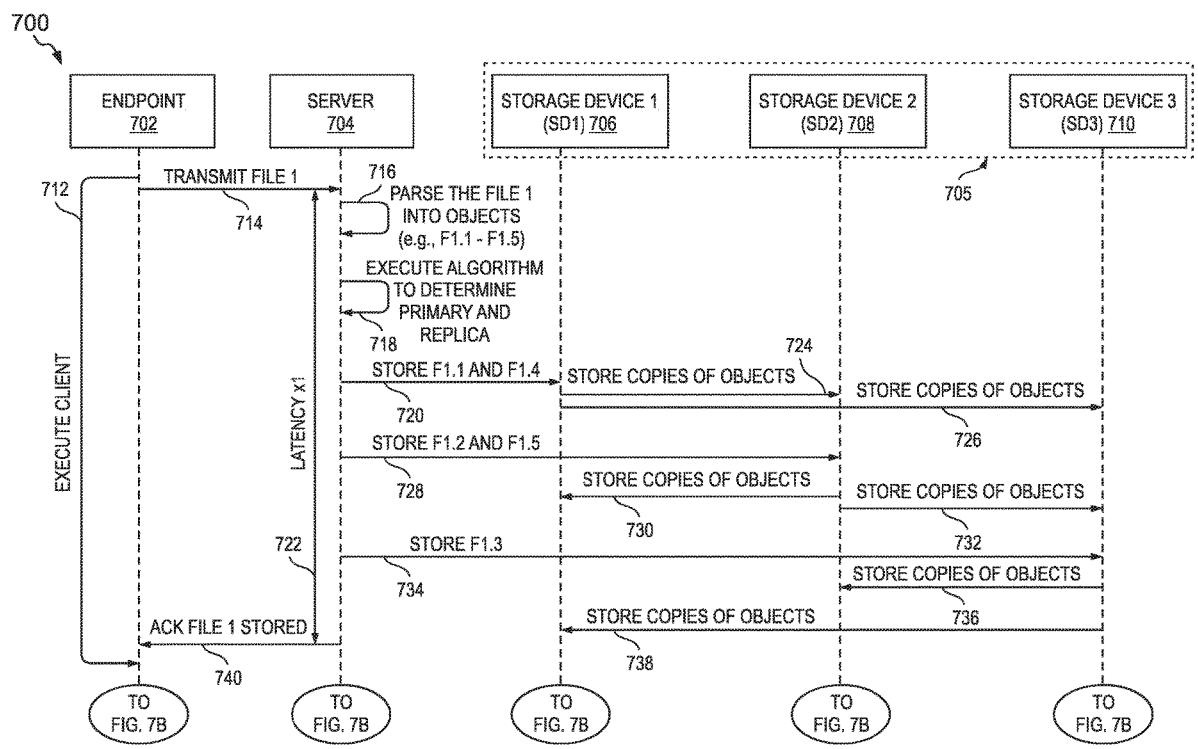
FIGS. 7A, 7B, 7C and 7D illustrate exemplary data transmissions between components of a system for improving the performance of a logical disk.

Turning to FIG. 7A, FIG. 7A illustrates exemplary data transmissions during a process of storing a file in the logical disk 705. At 712, the endpoint 702 executes a client. The endpoint 702 continues executing the throughout the process of storing the file. The client may be, e.g., the file system code block 406 of FIG. 4. At 714, the endpoint 702 transmits to the server 704 (via the client) File 1 for storage in the logical disk 705. The server 704 receives the file from the endpoint 702. At 716, the server 704 parses the File 1 into objects (e.g., using a striping algorithm in a distributed storage code block). Each of the objects is a fragment of the File 1. The objects are partitioned from the File 1 such that they can be appended one to another to reconstruct the File 1. In this example, the server 704 divides the File 1 into five objects (i.e., objects F1.1, F1.2, F1.3, F1.4, and F1.5 as is described with respect to file 116 in FIG. 1). At 718, the server 704 executes an algorithm (e.g., from the distributed storage code block) to determine a primary storage device (e.g., only one primary replica) and multiple replica storage devices for each of the objects. In some examples, the algorithm is the CRUSH algorithm is described in a 2006 publication titled, "CRUSH: Controlled, Scalable, Decentralized Placement of Replicated Data" by Sage A. Weil, et al. The logical disk stores the objects in the primary storage device and in each of the multiple replica storage devices. When objects are retrieved from the logical disk 705, they are retrieved from the primary storage device and not from the one or more replica storage devices.

To object F1.1, the server 704 assigns SD1 as the primary storage device and assigns SD2 and SD3 as the replica storage devices. To object F1.2, the server 704 assigns SD2 as the primary storage device and assigns SD1 and SD3 as the replica storage devices. To object F1.3, the server 704 assigns SD3 as its primary storage device and assigns SD1 and SD2 as the replica storage devices. To object F1.4, the server 704 assigns SD1 as the primary storage device and assigns SD2 and SD3 as the replica storage devices. To object F1.5, the server 704 assigns SD2 as the primary storage device and assigns SD1 and SD3 as its replica storage devices. At 720, the server 704 stores the objects F1.1 and F1.4 on SD1. At 724, SD1 transmits copies of the objects F1.1 and F1.4 to SD2 (e.g., based on SD2 being a replica storage device for the objects F1.1 and F1.4). At 726, SD1 transmits copies of the objects F1.1 and F1.4 to SD3 (e.g., based on SD3 being a replica storage device for the objects F1.1 and F1.4). At 728, the server 704 stores the objects F1.2 and F1.5 on the SD2. At 730, SD2 transmits copies of the objects F1.2 and F1.5 to SD1 (e.g., based on SD1 being a replica storage device for the objects F1.2 and F1.5). At 732, SD2 transmits copies of the objects F1.2 and F1.5 to SD3 (e.g., based on SD3 being a replica storage device for the objects F1.2 and F1.5). At 734, the server 704 stores the object F1.3 on the SD3. At 736, SD3 transmits copies of the object F1.3 to SD2 (e.g., based on SD2 being a replica storage device for the object F1.3). At 738, SD3 transmits copies of the object F1.3 to SD1 (e.g., based on SD1 being a replica storage device for the object F1.3). In this example, each primary storage device (e.g., using a distributed storage code block) copies an object to the appropriate replica storage device upon receipt of the object. However, in other examples, the server 704 may perform such distribution to replica storage devices while distributing objects to the primary storage devices. At 740, the server 704 transmits to the endpoint 702 (via the client) an acknowledgment that the File 1 was stored.

The latency X1 (as generally indicated by 722) is the time period between the endpoint 702 transmitting the File 1 for storage in the logical disk 705 and the File 1 being stored in the logical disk 705 (i.e., as objects F1.1-F1.5). The latency may be measured between the endpoint 702 transmitting the File 1 for storage in the logical disk 705 and acknowledgement (at 740) or at the completion of the storage of the last object (e.g., at 734, in this case). Latency X1 is an example of the latency of a write operation for the logical disk 705. The Latency X1 is influenced, at least in part, by a number of operations. Storing the file in the logical disk 705 causes each of the storage devices to execute multiple operations. In this example, at least nine operations are required to store the file in the logical disk 705 (i.e., 720, 724, 726, 728, 730, 732, 734, 736, and 738). Retrieving the file from the logical disk 705 causes each of the storage devices to execute one operation, as is illustrated in FIG. 7B.

Figure 7B:
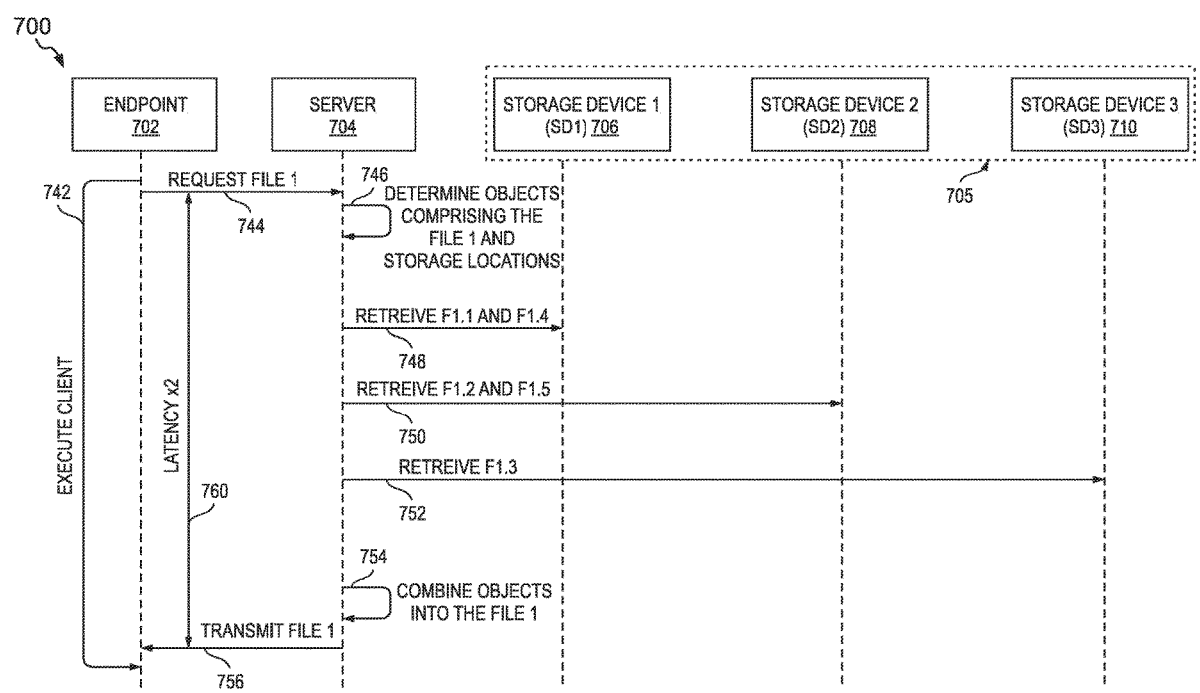

Turning to FIG. 7B, FIG. 7B illustrates exemplary data transmissions during a process of retrieving the file from the logical disk 705. The File 1 is stored (e.g., as objects F1.1-F1.5) prior to the processes described with respect to FIG. 7B. The process of storing the File 1 may be as described with respect to FIG. 7A or some other process. At 742, the endpoint 702 executes a client. The endpoint 702 continues executing the throughout the process of storing the file. The client may be, e.g., the file system code block 406 of FIG. 4. At 744, the endpoint 702 transmits to the server 704 (via the client) a request for the File 1 from the logical disk 705.

At 746, the server 704 determines objects comprising the file 1 and determines the storage location of each of the objects. In his example, the server determines that the File 1 was striped into five objects (i.e., F1.1-F1.5). The server 704 determines that object F1.1 is assigned SD1 as its primary storage device is assigned SD2 and SD3 as its replica storage devices. The server 704 determines that object F1.2 is assigned SD2 as its primary storage device is assigned SD1 and SD3 as its replica storage devices. The server 704 determines that object F1.3 is assigned SD3 as its primary storage device is assigned SD1 and SD2 as its replica storage devices. The server 704 determines that object F1.4 is assigned SD1 as its primary storage device is assigned SD2 and SD3 as its replica storage devices. The server 704 determines that object F1.5 is assigned SD2 as its primary storage device is assigned SD1 and SD3 as its replica storage devices.

The server 704 utilizes the logical disk 705 to retrieve each of the objects of the File 1 from their respective primary storage devices and not the replica storage devices. At 748, the server 704 retrieves the objects F1.1 and F1.4 from SD1 in the logical disk 705 (i.e., SD1 is the primary storage device for the objects F1.1 and F1.4). At 750, the server 704 retrieves the objects F1.2 and F1.5 from SD2 in the logical disk 705 (i.e., SD2 is the primary storage device for the objects F1.2 and F1.5). At 752, the server 704 retrieves the object F1.3 from SD3 in the logical disk 705 (i.e., SD3 is the primary storage device for the object F1.3).

At 754, the server 704 combines the objects F1.1, F1.2, F1.3, F1.4, and F1.5 into the File 1 (i.e., generates an instance of the File 1 from the objects). At 756, the server 704 transmits (via the client) the File 1 to the server endpoint 702.

The latency X2 (as generally indicated by 760) is the time period between the endpoint 702 requesting the File 1 from the logical disk 705 and the File 1 being transmitted to the endpoint 702. Latency X2 is an example of the latency of a read operation for the logical disk 705. The Latency X1 is influenced, at least in part, by a number of operations performed by the storage devices during the retrieval of the file. Retrieving the file from the logical disk 705 causes each of the storage devices to one operation. In this example, at least three operations are required to retrieve the file from the logical disk 705 (i.e., 748, 750, and 752).

Figure 7C:
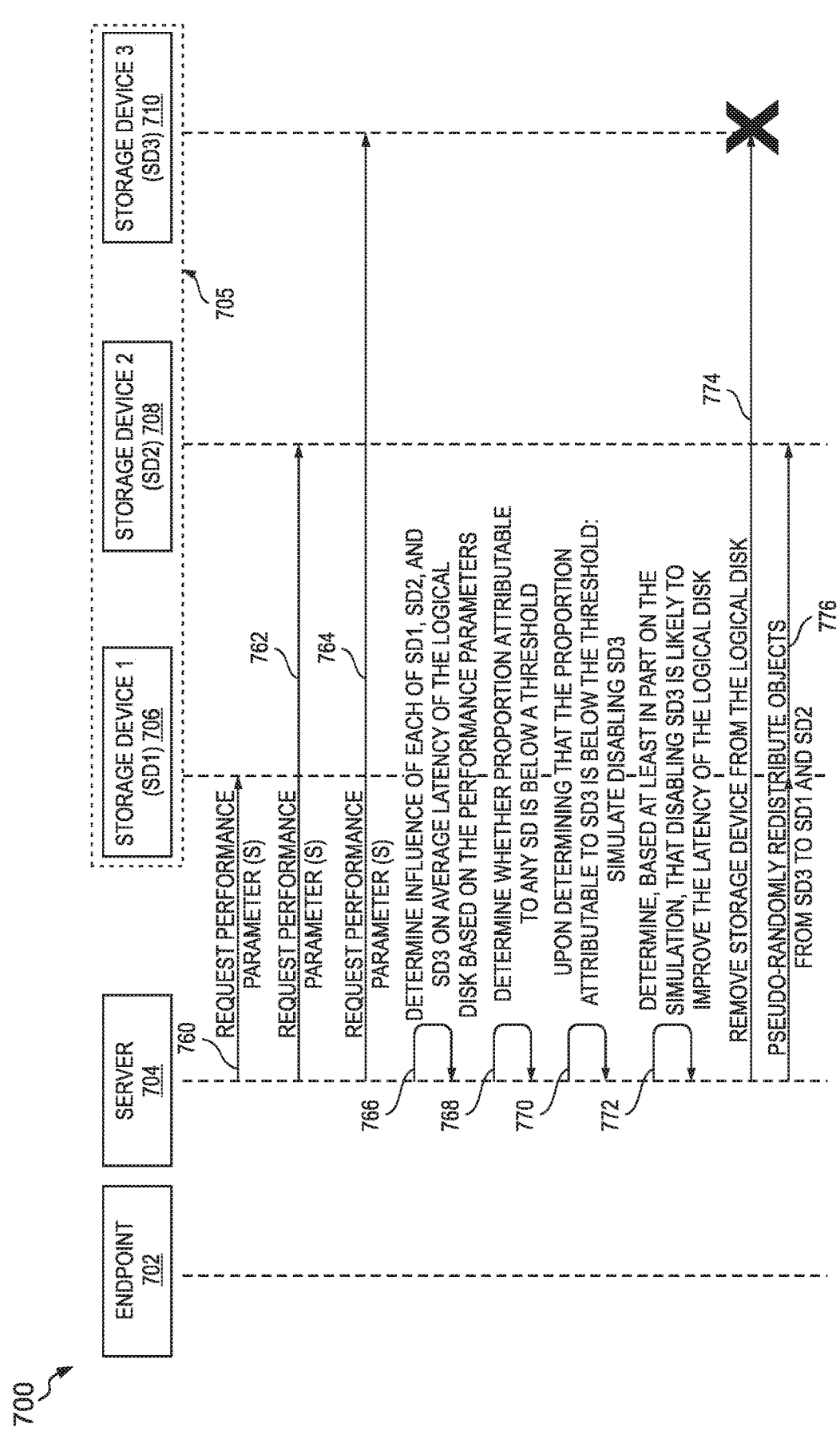

Turning to FIG. 7C, FIG. 7C illustrates a server 704 reconfiguring logical disk 705 to reduce the latency the based on performance parameters of storage devices in the logical disk 705. The server 704 retrieves performance parameter from each of the storage devices. At 760, the server 704 requests one or more performance parameters from SD1. The server 704 receives the performance parameters from SD1 based on the request. At 762, the server 704 requests performance parameter(s) from SD2. The server 704 receives the performance parameters from SD2 based on the request. At 764, the server 704 requests performance parameter(s) from SD3. The server 704 receives the performance parameters from SD3 based on the request. At 766, the server 704 determines an influence of each of the storage devices SD1, SD2, and SD3 on an average latency of the logical disk based on the performance parameters. The server 704 may utilize metadata that identifies threshold values for each of a plurality of performance parameters. The server 704 can use the threshold values to determine whether to reconfigure the storage devices in the logical disk 705 (e.g., based on whether the storage devices meet the threshold for the logical disk). The thresholds may be actual values (e.g., 15 ms of latency) of the performance parameters or may be a relative measure (e.g., a storage devices with the slowest latency relative to all others in the logical disk, worst performing 10% of the storage devices, and the like). An endpoint (e.g., 702) may have previously received input setting a threshold value for latency of a storage device. The server can then automatically (e.g., without any further input or prompting) toggle a storage device on or off when a performance parameter crosses the threshold value. At 768, the server 704 determines whether a proportion (of the performance parameter) attributable to any storage device is below a threshold. At 770, upon determining that the proportion of the performance parameter attributable to SD3 is below the threshold, the server 704 simulates disabling SD3. At 772, the server 704 determines, based at least in part on the simulation, that disabling SD3 is likely to improve the latency of the logical device. At 774, the server 704 removes the storage device SD3 from the logical device 705. Removing SD3 improves the performance of a logical disk by reducing a latency of the logical disk 705. At 776, the server 704 pseudo-randomly redistributes objects from SD3 to SD1 and SD2.

In some cases, reconfiguring the logical device 705 (e.g., by removing storage devices) may lead to others of the storage devices become overloaded with objects. Thus, a user interface (e.g., a graphical user interface (GUI), or command-line interface (CLI)) can be used to receive input from an endpoint associated with a user. The user interface allows a user to assess the impact of such reconfigurations and to approve or not approve and reconfigurations suggested by the server. In some embodiments, the threshold value is dynamically relaxed (e.g., becomes less restrictive) by a pre-specified amount (or percent) after each device is removed from the logical disk. Such dynamically relaxed threshold values helps reduce the likelihood of the degeneration of the logic disk due to the secondary impact of removing storage devices (repeatedly turning off a storage device, which results in others of the storage devices failing to meeting the threshold because they are sharing a higher proportion of the load than before the removal). For example, the threshold for latency may begin at 15 ms for any storage device in a logical disk. After one device is removed from the logical disk, the threshold is relaxed by a factor (e.g., 10%) and, therefore, becomes 15 ms*(1+0.1)=16.5 ms. After a second device is removed from the logical disk, the threshold is relaxed by the factor (e.g., 10%) and, therefore, becomes 16.5 ms*(1+0.1)=18.15 ms. In other cases the threshold is relaxed by an increment (e.g., 2 ms) and, therefore, can go from 15 ms to 15−2=13 ms (i.e., after one device is removed from the logical disk) and from 13 ms to 13−2=11 ms (i.e., after a second device is removed from the logical disk). In further embodiments, the threshold value is dynamically restricted (e.g., becomes more restrictive) by a pre-specified amount (or percent) after each device is removed from the logical disk.

Figure 7D:
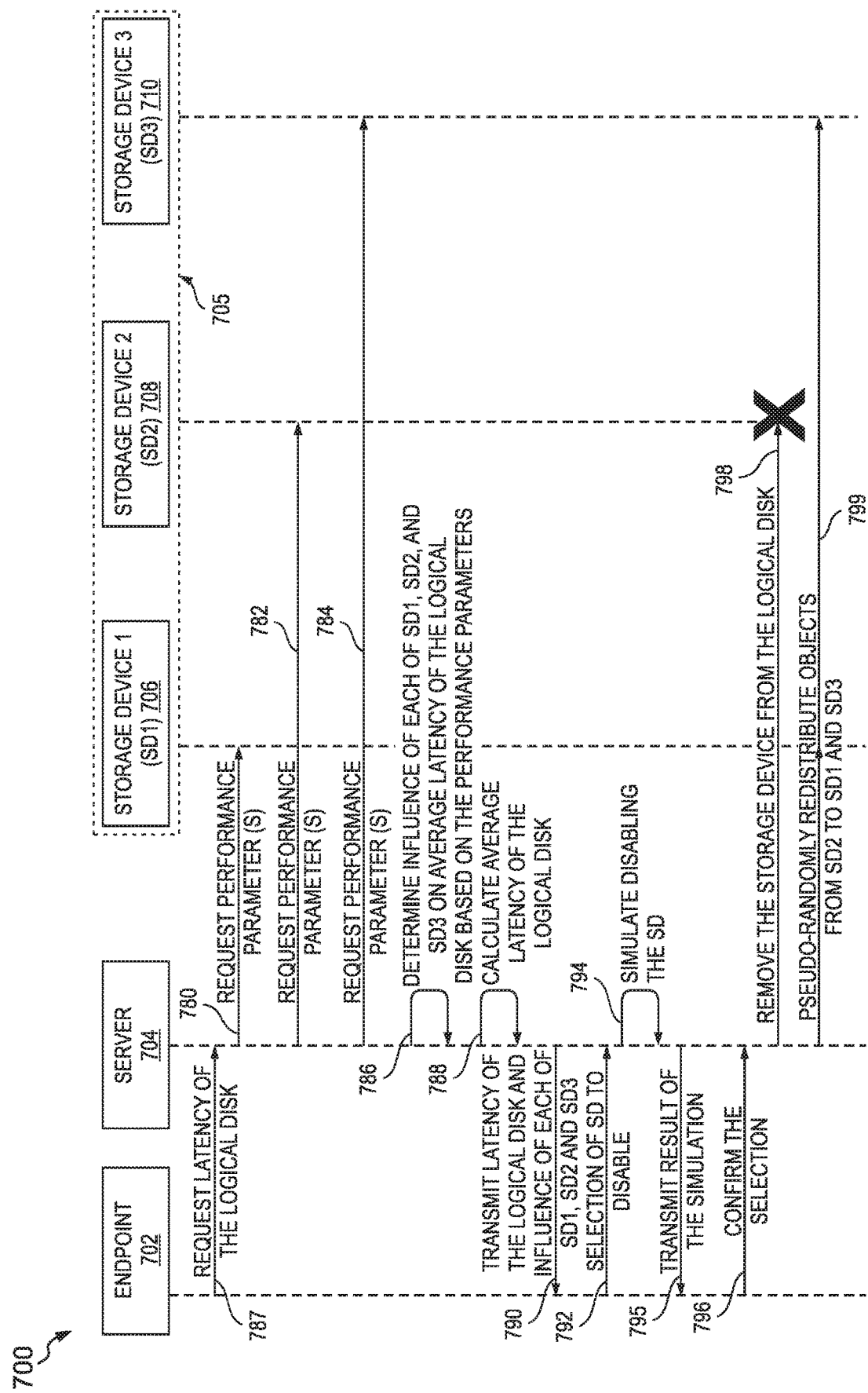

Turning to FIG. 7D, FIG. 7D illustrates a server 704 reconfiguring logical disk 705 to reduce the latency the based on input received from the endpoint 702 via a graphical interface for a logical disk management module. At 787, the endpoint 702 transmits to the server 704 a request for latency of the logical disk 705 (e.g., via the graphical interface). In response to the request received from the endpoint 702 (i.e., at 787), the server 704 retrieves performance parameters from each of the storage devices in the logical disk 705. The server 704 uses the performance parameters to generate a response to the request. At 780, the server 704 transmits to the storage device SD1 a request for performance parameters. The server 704 receives the performance parameters from SD1 based on the request. At 782, the server 704 transmits to the storage device SD2 a request for performance parameters. The server 704 receives the performance parameters from SD2 based on the request. At 784, the server 704 transmits to the storage device SD3 a request for performance parameters. The server 704 receives the performance parameters from SD3 based on the request.

At 786, the server 704 determines an influence of each of the storage devices SD1, SD2, and SD3 on an average latency of the logical disk based on the performance parameters. For example, a numerical representation of the influence of each storage device may be determined using a mathematical model. In some examples, the numerical representation is a weighting factor for each of the plurality of storage devices SD1, SD2, and SD3. A portion of a latency of a logical device that is attributable to each storage device (i.e., a weighted latency for each storage device) in the logical device is calculated based, at least in part, on a corresponding latency of each storage device weighted by the corresponding weighting factor.

At 788, the server 704 calculates an average latency of the logical disk 705. A performance parameter of a logical disk can be calculated based, at least in part, on corresponding performance parameters each of the storage devices and the weighting factor. Thus, the latency of the logical disk 705 can be calculated by summing the weighted latency for each of the storage devices SD1, SD2, and SD3 in the logical disk 705.

At 790, the latency of the logical disk 705 and the influence of the storage devices SD1, SD2, and SD3 are transmitted to the endpoint 702. The latency of the logical disk 705 and the influence of the storage devices SD1, SD2, and SD3 may be rendered in the graphical interface (e.g., similar to that illustrate in FIG. 8).

At 792, the endpoint 702 transmits to the server 704 a selection of one of the storage devices SD1, SD2, and SD3 to disable from the logical disk 705. The selection may be receives via the graphical interface. In this example, the selection identifies SD2 as the storage device to be removed from the logical disk 705. At 794, the server 704 simulates disabling the storage device from the logical disk 705. At 795, the server 704 transmits to the endpoint 702 a result of the simulation. The results may include simulated performance parameters of the logical disk 705 (e.g., with SD2 simulated as being removed). The graphical interface may generate a window for receiving, from the endpoint 702, input to confirm the original selection of SD2 at 792 (e.g., to accept or not accept the original selection based on the result of the simulation). At 796, the endpoint 702 transmits to the server 704 a confirmation of the selection (i.e., the original selection of SD2 at 792). At 798, the server 704 removes the storage device SD2 from the logical device 705. Removing SD2 improves the performance of a logical disk by reducing a latency of the logical disk 705. At 799, the server 704 pseudo-randomly redistributes objects from SD2 to SD1 and SD3.

Figure 8:
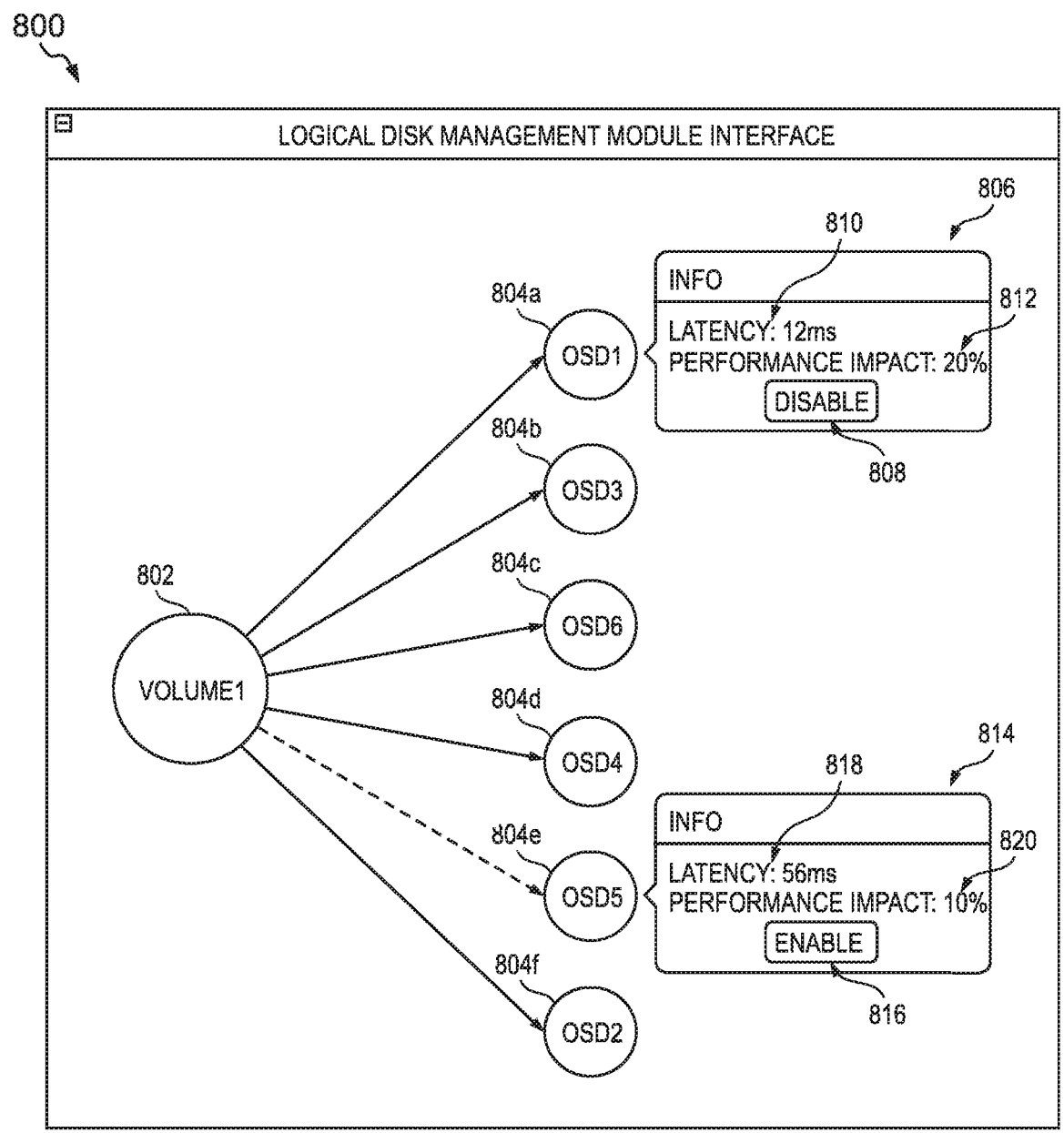
FIG. 8 is an exemplary graphical interface for a logical disk management module.

FIG. 8 is an exemplary graphical user interface (i.e., GUI 800) for a logical disk management module. The GUI 800 renders a graphical component 802 identifying the logical disk (i.e., labeled "VOLUME 1") and graphical components 804a-804f identifying storage devices (i.e., object storage devices (OSD)) that define the logical disk (labeled "OSD1", "OSD2", "OSD3", "OSD4", "OSD5", and "OSD6"). Lines connecting the graphical component 802 to the graphical components 804a-804f graphically represent whether each of the corresponding logical disks is associated with the logical disk; a solid line identifies that the storage device is associated with the logical disk; a dashed line identifies that the storage device is not associated with the logical disk. The logical disk (VOLUME 1) comprises the storage devices OSD1, OSD2, OSD3, OSD4, and OSD6 (as indicated by the solid lines). The storage device OSD5 is not included in the logical disk (VOLUME 1) (as indicated by the dashed line).

Each of the graphical components (i.e., 802 and 804a-804f) is selectable to toggle on/or of a further display of detailed information associated with the storage device in the context of the logical disk. In this example, the detailed information includes a performance parameter and a performance impact for the selected storage device. The performance parameter is a latency (measured in milliseconds) of the selected storage device. The performance impact is a proportion of a latency of the logical device that is attributable to the selected storage device. In this example, each of the graphical components 804a and 804e were selected to display the further information in windows 806 and 814, respectively.

The window 806 includes text 810, text 812, and button 808. The text 810 identifies that the storage device OSD1 has a latency of 12 ms. The text 812 identifies that the storage device OSD1 has performance impact of 20 percent on the logical disk (i.e., the influence of the storage device on the logical disk). In other words, 20 percent of the latency of the logical device is attributable to the storage device OSD1. The button 808 includes the text "DISABLE". When the button 808 is selected, it causes the corresponding storage device (in this case, OSD1) to be removed from the logical disk and causes the text to be togged from reading "DISABLE" to "ENABLE". In effect, the button allows the corresponding storage device to be selectively removed from or added to the logical disk.

The window 814 includes text 818, text 820, and button 816. The text 818 identifies that the storage device OSD5 has a latency of 56 ms. It is noted, again, that the storage device OSD5 is not included in the logical disk (as indicated by the dashed line). The text 820 identifies a performance impact that resulted from simulating the storage device OSD5 being added to the logical disk. In this case, the storage device OSD5 would have a performance impact of 10 percent on the logical disk (i.e., the influence of the storage device on the logical disk). In other words, 10 percent of the latency of the logical device would be attributable to the storage device OSD5 (if it were added to the logical disk). The button 816 includes the text "ENABLE". When the button 816 is selected, it causes the corresponding storage device (in this case, OSD5) to be added to the logical disk and causes the text to be togged from reading "ENABLE" to "DISABLE".

The GUI 800 provides a device (e.g., an endpoint, network element, and the like) with interactive information describing the logical disk and the storage devices therein. For example, a user may use an input interface of the device (e.g., keyboard, a display, touchscreen, and/or of other input interface) to provide input to the GUI 800. Thus, the GUI 800 enables the device to control adding or removing storage devices from the logical disk.

In some examples, the graphical components 804a-804f may be rendered to graphical depict an indication of the influence of the storage device on the logical disk. For example, each of the graphical components 804a-804f may be shaded using a color that corresponds to their influence on the logical disk. In such an example, each of the graphical components 804a-804f is shaded with a color (e.g., filled with a color) selected from a gradient from a first color to a second color (e.g., where 0% influence corresponds to the first color and 100% influence corresponds to the second color). The gradient may be from white to black, green to red, or any other combination of first and second colors.

The example of FIG. 8 is a graphical user interface that renders a diagrammatic rendering of the logic disk. However, the teachings of the present disclosure are not limited to the use of diagrammatic interfaces. For example, text based interfaces such as command-line interface (CLI) can be used to receive input from and provide output to an endpoint associated with a user.

Additionally, it should be noted that with the examples provided above, interaction may be described in terms of specific numbers of (e.g., one, two, three, or four) network elements, endpoints, servers, logical disks, storage devices, etc. However, this has been done for purposes of clarity and example only. In certain cases, it may be easier to describe one or more of the functionalities of a given set of flows by only referencing a limited number of network elements, endpoints, servers, logical disks, storage devices, etc. It should be appreciated that the systems described herein are readily scalable and, further, can accommodate a large number of components, as well as more complicated/sophisticated arrangements and configurations. Accordingly, the examples provided should not limit the scope or inhibit the broad techniques of using various protocols for improving performance of object storage systems, as potentially applied to a myriad of other architectures.

It is also important to note that the steps in the Figures illustrate only some of the possible scenarios that may be executed by, or within, the elements described herein. Some of these steps may be deleted or removed where appropriate, or these steps may be modified or changed considerably without departing from the scope of the present disclosure. In addition, a number of these operations have been described as being executed concurrently with, or in parallel to, one or more additional operations. However, the timing of these operations may be altered considerably. The preceding operational flows have been offered for purposes of example and discussion. Substantial flexibility is provided by network elements, endpoints, servers, storage devices, in that any suitable arrangements, chronologies, configurations, and timing mechanisms may be provided without departing from the teachings of the present disclosure.

It should also be noted that many of the previous discussions may imply a single client-server relationship. In reality, there is a multitude of servers in the delivery tier in certain implementations of the present disclosure. Moreover, the present disclosure can readily be extended to apply to intervening servers further upstream in the architecture, though this is not necessarily correlated to the 'm' clients that are passing through the 'n' servers. Any such permutations, scaling, and configurations are clearly within the broad scope of the present disclosure.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 as it exists on the date of the filing hereof unless the words "means for" or "step for" are specifically used in the particular claims; and (b) does not intend, by any statement in the specification, to limit this disclosure in any way that is not otherwise reflected in the appended claims.

What is claimed is:

1. A method comprising:
    storing a file in a logical disk, wherein fragments of the file are stored distributed across a plurality of storage devices comprising the logical disk and each of the fragments of the file is asymmetrically stored in and retrieved from the plurality of storage devices; and
    reducing latency of the logical disk based on the asymmetrical storage in and retrieval from the plurality of storage devices by:
        calculating, for each of the plurality of storage devices, at least one impact factor that impacts performance, the at least one impact factor identifying a proportion of the fragments stored in or retrieved from each of the plurality of storage devices relative to others of the plurality of storage devices based on the asymmetrical storage in and retrieval from each of the plurality of storage devices;
        calculating a proportion of a latency of the logical disk that is attributable to each of the plurality of storage devices based, at least in part, on the at least one impact factor and a latency of each of the plurality of storage devices; and
        reconfiguring one or more of the plurality of storage devices based on the proportion of the latency of the logical disk that is attributable to each of the plurality of storage devices,
        wherein, the at least one impact factor includes a read impact factor and a write impact factor,
        the read impact factor identifies a first number of fragments that has a particular storage device of the plurality of storage devices as its primary storage device,
        and the write impact factor identifies a sum of the first number of fragments and a second number of fragments that has the particular storage device as its replica storage device.

2. The method of claim 1, wherein the reconfiguring one or more of the plurality of storage devices based on the proportion of the latency of the logical disk that is attributable to each of the plurality of storage devices comprises:
    determining which of the plurality of storage devices is a storage device for removal from the logical disk is based on the proportion of the latency of the logical disk that is attributable to the storage device; and
    removing the storage device from the logical disk.

3. The method of claim 2, wherein the removing the storage device from the logical disk comprises:
    transferring data from the storage device to others of the plurality of storage devices by pseudo-randomly distributing from the storage device to the others of the plurality of storage devices all fragments associated with files stored in the logical disk;
    disassociating the storage device from the logical disk; and
    deleting, from the storage device, all the fragments associated with files stored in the logical disk.

4. The method of claim 1, wherein the reconfiguring one or more of the plurality of storage disks based on the proportion of the latency of the logical disk that is attributable to each of the plurality of storage devices comprises:
    associating a new storage device to the plurality of storage devices comprising the logical disk; and
    transferring data from others of the plurality of storage devices to the new storage device by pseudo-randomly distributing from the others of the plurality of storage devices a portion of fragments associated with files stored in the logical disk.

5. The method of claim 2, wherein the proportion for the storage device is larger than the proportion for others of the plurality of storage devices.

6. The method of claim 1, wherein the each of the fragments of the file being asymmetrically stored in and retrieved from the plurality of storage devices comprises the logical disk accessing the plurality of storage devices a different number of times for retrieving each of the fragments than for writing each of the fragments.

7. The method of claim 1, wherein the each of the fragments of the file being asymmetrically stored in and retrieved from the plurality of storage devices comprises:
    writing, by the logical disk, a fragment of the fragments to a first storage device as its primary storage device and to each of one or more second storage devices as its replica storage device, of the plurality of storage devices;
    and retrieving, by the logical disk, the fragment from the first storage device and not from the one or more second storage devices.

8. The method of claim 7, wherein the calculating the proportion of the latency of the logical disk that is attributable to each of the plurality of storage devices comprises:
    retrieving the latency of each of the plurality of storage devices, wherein the latency of each of the plurality of storage devices is latency of input/output ("I/O") operations measured during a window of time, determining a weighting factor for each of the plurality of storage devices based, at least in part, on the read impact factor and/or the write impact factor; and
    determining a weighted latency for each of the plurality of storage devices based on the latency of the I/O operations measured during the window of time and the weighting factor by multiplying the latency of the I/O operations by the weighting factor.

9. The method of claim 8, further comprising:
    calculating a latency of the logical disk by summing the weighted latency for each of the plurality of storage devices.

10. The method of claim 1, wherein the at least one impact factor is a number of operations in a queue of operations to be performed by each of the plurality of storage devices, a total number of objects stored by each of the plurality of storage devices, and/or a total number of logical disks using each of the plurality of storage devices.

11. A system comprising:
    a logical disk configured to store a file, wherein fragments of the file are stored distributed across a plurality of storage devices comprising the logical disk and each of the fragments of the file is asymmetrically stored in and retrieved from the plurality of storage devices;

and a network element configured to reduce latency of the logical disk based on the asymmetrical storage in and retrieval from the plurality of storage devices by:
  calculating, for each of the plurality of storage devices, at least one impact factor that impacts performance, the at least one impact factor identifying a proportion of the fragments stored in or retrieved from each of the plurality of storage devices relative to others of the plurality of storage devices based on the asymmetrical storage in and retrieval from each of the plurality of storage devices;
  calculating a proportion of a latency of the logical disk that is attributable to each of the plurality of storage devices based, at least in part, on the at least one impact factor and a latency of each of the plurality of storage devices;
  and reconfiguring one or more of the plurality of storage devices based on the proportion of the latency of the logical disk that is attributable to each of the plurality of storage devices,
  wherein,
    the at least one impact factor includes a read impact factor and a write impact factor,
    the read impact factor identifies a first number of fragments that has a particular storage device of the plurality of storage devices as its primary storage device,
    and the write impact factor identifies a sum of the first number of fragments and a second number of fragments that has the particular storage device as its replica storage device.

12. The system of claim 11, wherein the each of the fragments of the file being asymmetrically stored in and retrieved from the plurality of storage devices comprises:
  writing, by the logical disk, a fragment of the fragments to a first storage device as its primary storage device and to each of one or more second storage devices as its replica storage device, of the plurality of storage devices;
  and retrieving, by the logical disk, the fragment from the first storage device and not from the one or more second storage devices.

13. The system of claim 12, wherein the calculating the proportion of the latency of the logical disk that is attributable to each of the plurality of storage devices comprises:
  retrieving the latency of each of the plurality of storage devices, wherein the latency of each of the plurality of storage devices is latency of input/output ("I/O") operations measured during a window of time;
  determining a weighting factor for each of the plurality of storage devices based, at least in part, on the read impact factor and/or the write impact factor; and
  determining a weighted latency for each of the plurality of storage devices based on the latency of the I/O operations measured during the window of time and the weighting factor by multiplying the latency of the I/O operations by the weighting factor.

14. The system of claim 11, wherein the at least one impact factor is a number of operations in a queue of operations to be performed by each of the plurality of storage devices, a total number of objects stored by each of the plurality of storage devices, and/or a total number of logical disks using each of the plurality of storage devices.

15. A computer-readable non-transitory medium comprising instructions, that when executed by at least one processor configure the at least one processor to perform operations comprising:
  storing a file in a logical disk, wherein fragments of the file are stored distributed across a plurality of storage devices comprising the logical disk and each of the fragments of the file is asymmetrically stored in and retrieved from the plurality of storage devices; and
  reducing latency of the logical disk based on the asymmetrical storage in and retrieval from the plurality of storage devices by:
    calculating, for each of the plurality of storage devices, at least one impact factor that impacts performance, the at least one impact factor identifying a proportion of the fragments stored in or retrieved from each of the plurality of storage devices relative to others of the plurality of storage devices based on the asymmetrical storage in and retrieval from each of the plurality of storage devices;
    calculating a proportion of a latency of the logical disk that is attributable to each of the plurality of storage devices based, at least in part, on the at least one impact factor and a latency of each of the plurality of storage devices; and
    reconfiguring one or more of the plurality of storage devices based on the proportion of the latency of the logical disk that is attributable to each of the plurality of storage devices,
    wherein,
      the at least one impact factor includes a read impact factor and a write impact factor,
      the read impact factor identifies a first number of fragments that has a particular storage device of the plurality of storage devices as its primary storage device,
      and the write impact factor identifies a sum of the first number of fragments and a second number of fragments that has the particular storage device as its replica storage device.

16. The computer-readable non-transitory medium of claim 15, wherein the each of the fragments of the file being asymmetrically stored in and retrieved from the plurality of storage devices comprises:
  writing, by the logical disk, a fragment of the fragments to a first storage device as its primary storage device and to each of one or more second storage devices as its replica storage device, of the plurality of storage devices;
  and retrieving, by the logical disk, the fragment from the first storage device and not from the one or more second storage devices.

17. The computer-readable non-transitory medium of claim 16, wherein the calculating the proportion of the latency of the logical disk that is attributable to each of the plurality of storage devices comprises:
  retrieving the latency of each of the plurality of storage devices, wherein the latency of each of the plurality of storage devices is latency of input/output ("I/O") operations measured during a window of time;
  determining a weighting factor for each of the plurality of storage devices based, at least in part, on the read impact factor and/or the write impact factor; and
  determining a weighted latency for each of the plurality of storage devices based on the latency of the I/O operations measured during the window of time and the weighting factor by multiplying the latency of the I/O operations by the weighting factor.

18. The computer-readable non-transitory medium of claim 15, wherein the at least one impact factor is a number of operations in a queue of operations to be performed by each of the plurality of storage devices, a total number of objects stored by each of the plurality of storage devices, and/or a total number of logical disks using each of the plurality of storage devices.

* * * * *